(12) United States Patent
Kozaki

(10) Patent No.: US 11,809,205 B2
(45) Date of Patent: Nov. 7, 2023

(54) ESTIMATOR AND VACUUM VALVE

(71) Applicant: SHIMADZU CORPORATION, Kyoto (JP)

(72) Inventor: Junichiro Kozaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 493 days.

(21) Appl. No.: 17/194,593

(22) Filed: Mar. 8, 2021

(65) Prior Publication Data

US 2021/0286384 A1 Sep. 16, 2021

(30) Foreign Application Priority Data

Mar. 13, 2020 (JP) .................................. 2020-044344

(51) Int. Cl.

| | |
|---|---|
| *G05D 16/20* | (2006.01) |
| *G05B 15/02* | (2006.01) |
| *F16K 37/00* | (2006.01) |
| *F16K 31/04* | (2006.01) |
| *F04B 49/08* | (2006.01) |
| *F16K 27/04* | (2006.01) |
| *F04B 49/06* | (2006.01) |

(52) U.S. Cl.
CPC .......... *G05D 16/208* (2013.01); *G05B 15/02* (2013.01); *G05D 16/2013* (2013.01); *F04B 49/065* (2013.01); *F04B 49/08* (2013.01); *F16K 27/04* (2013.01); *F16K 31/046* (2013.01); *F16K 37/0041* (2013.01)

(58) Field of Classification Search
CPC ............. G05D 16/208; G05D 16/2013; G05D 16/202; G05B 15/02; F16K 27/04; F16K 37/0041; F16K 31/046; F04B 49/065; F04B 49/08

USPC .............. 137/13, 487.5; 156/345.15, 345.24, 156/345.26; 118/715
See application file for complete search history.

(56) References Cited

U.S. PATENT DOCUMENTS

| | | | | |
|---|---|---|---|---|
| 5,989,929 A | * | 11/1999 | Nikoh | ................. H01J 37/3299 156/345.24 |
| 6,022,483 A | * | 2/2000 | Aral | ..................... G05D 16/202 156/345.29 |
| 6,041,817 A | * | 3/2000 | Guertin | ................... F16K 51/02 137/565.23 |
| 6,478,923 B1 | * | 11/2002 | Igarashi | .............. C23C 16/4412 156/345.24 |

(Continued)

FOREIGN PATENT DOCUMENTS

JP 5087073 B 11/2012

*Primary Examiner* — Minh Q Le
(74) *Attorney, Agent, or Firm* — Renner, Otto, Boisselle & Sklar, LLP

(57) ABSTRACT

An estimator comprises: an acquisitor to acquire a plurality of data pairs each containing a valve body opening of the vacuum valve and the chamber pressure at the valve body opening; and an operator to operate the gas species characteristic value and the first chamber volume estimation value, based on an exhaust's expression representing a relationship among the second effective exhaust rate, a flow rate of a gas introduced into the vacuum chamber, a chamber volume, and a chamber pressure, the plurality of data pairs acquired in the acquisitor, and correlation data between the valve body opening and the second effective exhaust rate about the predetermined known gas.

8 Claims, 14 Drawing Sheets

(56) References Cited

U.S. PATENT DOCUMENTS

| | | | |
|---|---|---|---|
| 7,369,920 B2 | 5/2008 | Chamberlain | |
| 8,833,388 B2* | 9/2014 | Eto | H01L 21/67253 |
| | | | 251/212 |
| 8,846,546 B2* | 9/2014 | Takeda | H01L 21/02529 |
| | | | 427/249.15 |
| 9,880,569 B2* | 1/2018 | Vyers | G05D 16/2066 |
| 2003/0131792 A1* | 7/2003 | Park | C23C 16/45557 |
| | | | 118/712 |
| 2006/0032444 A1* | 2/2006 | Hara | C23C 16/45544 |
| | | | 427/248.1 |
| 2006/0175012 A1* | 8/2006 | Lee | C23C 16/4486 |
| | | | 438/758 |
| 2006/0185593 A1* | 8/2006 | Choi | C23C 16/14 |
| | | | 427/248.1 |
| 2007/0225870 A1 | 9/2007 | Chamberlain | |
| 2011/0076857 A1* | 3/2011 | Akae | H01L 21/0228 |
| | | | 438/770 |
| 2012/0038277 A1* | 2/2012 | Eto | H01J 37/32183 |
| | | | 315/111.21 |
| 2012/0227830 A1* | 9/2012 | Eto | G05D 16/202 |
| | | | 137/67 |
| 2013/0149872 A1* | 6/2013 | Hirose | H01L 21/02183 |
| | | | 438/762 |
| 2018/0196449 A1* | 7/2018 | Hirata | F16K 37/005 |
| 2019/0107110 A1* | 4/2019 | Kozaki | F04D 17/168 |
| 2020/0109706 A1* | 4/2020 | Kozaki | F16K 27/04 |
| 2022/0165594 A1* | 5/2022 | Kozaki | G05D 16/2013 |
| 2022/0235787 A1* | 7/2022 | Kozaki | F04D 27/001 |

\* cited by examiner

FIG. 7 (FIRST EMBODIMENT)

ESTIMATOR AND VACUUM VALVE

BACKGROUND OF THE INVENTION

1. Technical Field

The present invention relates to an estimator and a vacuum valve.

2. Background Art

A chamber in which a semiconductor process such as dry etching is performed is vacuum pumped by a vacuum pump (for example, a turbo-molecular pump) disposed through a valve. A process gas to be introduced into a chamber is adjusted by a flow rate controller such that predetermined conditions such as a gas species and a gas flow rate are achieved. A chamber pressure is also one of the important process conditions and maintained at a predetermined pressure value by controlling a valve body opening position of a valve such that a predetermined pressure value is achieved.

The process conditions usually involve a plurality of steps under different conditions. The conditions in each of these steps are switched at each predetermined time to proceed with a processing. In such a processing, a pressure is necessary to immediately converge to the next predetermined pressure value (target pressure value) at a switching timing between steps, and a pressure change in each step section is necessary to be as small as possible, in order to ensure uniformity of the process. Therefore, an automatic pressure adjusting valve to control the drive of a valve body by a motor is used as a valve.

Usually, an initial calibration manipulation is performed when use of an automatic pressure adjusting valve attached to an apparatus begins. In the initial calibration manipulation, an estimation operation or measurement of a chamber volume and a measurement operation processing of an effective exhaust rate at each valve body opening are performed. Generally, a gas introduced into a chamber during the manipulation is often not an actually used process gas but a handleable single gas (for example, noble gas such as helium and argon).

For example, in the pressure control system described in Patent Literature 1 (JP5087073B), an estimation operation of a chamber volume is performed using a pressure measurement value and an expression based on pressure dynamics. Based on the estimated chamber volume and the pressure measurement value at each of a plurality of valve body openings, an estimation operation of an effective exhaust rate at each valve body opening is performed. It is noted that in the estimation operation described in Patent Literature 1, a gas flow rate and an effective exhaust rate when a valve body is almost totally enclosed are necessary, and they are previously given as known values.

SUMMARY OF THE INVENTION

As described above, in the estimation operation described in Patent Literature 1, not only a flow rate value of a gas to be introduced into a chamber but also an effective exhaust rate in an almost totally enclosed state is necessary to be known. In general, an effective exhaust rate is determined according to a conductance value of a valve itself and an exhaust rate value of a vacuum pump. However, in an almost totally enclosed state, it is determined according to only a conductance value. A relationship between a valve body opening and a conductance value of an automatic pressure adjusting valve can be previously obtained as information from a valve manufacturer for a specific gas species. However, when the information is used, the type of a gas flown by a user in a calibration manipulation comes to be limited to the specific gas species. Therefore, a problem is caused when a user cannot flow a gas of the specific gas species.

An estimator estimates, for a vacuum pumping apparatus including a vacuum pump to vacuum pump a vacuum chamber and a vacuum valve disposed on a suction port side of the vacuum pump to adjust a chamber pressure of the vacuum chamber, a gas species characteristic value that is a ratio between a first effective exhaust rate of the vacuum pumping apparatus about an exhausted gas and a second effective exhaust rate of the vacuum pumping apparatus about a predetermined known gas, and a first chamber volume estimation value of the vacuum chamber. The estimator comprises: an acquisitor to acquire a plurality of data pairs each containing a valve body opening of the vacuum valve and the chamber pressure at the valve body opening; and an operator to operate the gas species characteristic value and the first chamber volume estimation value, based on an exhaust's expression representing a relationship among the second effective exhaust rate, a flow rate of a gas introduced into the vacuum chamber, a chamber volume, and a chamber pressure, the plurality of data pairs acquired in the acquisitor, and correlation data between the valve body opening and the second effective exhaust rate about the predetermined known gas.

A vacuum valve disposed between a vacuum chamber and a vacuum pump to vacuum pump the vacuum chamber for adjusting a chamber pressure of the vacuum chamber. A chamber pressure of the vacuum chamber is adjusted based on the first chamber volume estimation value operated in the estimator.

A first calibrator to fix an opening of a vacuum valve to a predetermined opening value and operate a second chamber volume estimation value of the vacuum chamber based on a chamber pressure of the vacuum chamber measured at the predetermined opening value. The first calibrator sets a time during which the valve body opening is fixed to the predetermined opening value, in accordance with pressure response characteristics of the vacuum chamber based on the gas species characteristic value and the first chamber volume estimation value operated in the estimator.

A vacuum valve disposed between a vacuum chamber and a vacuum pump to vacuum pump the vacuum chamber for adjusting a chamber pressure of the vacuum chamber. The vacuum valve comprises a first calibrator to fix an opening of a vacuum valve to a predetermined opening value and operate a second chamber volume estimation value of the vacuum chamber based on a chamber pressure of the vacuum chamber measured at the predetermined opening value, a chamber pressure of the vacuum chamber is adjusted based on the second chamber volume estimation value operated in the first calibrator, and the first calibrator sets a time during which the valve body opening is fixed to the predetermined opening value, in accordance with pressure response characteristics of the vacuum chamber based on the gas species characteristic value and the first chamber volume estimation value operated in the estimator.

The plurality of data pairs used for an operation of the gas species characteristic value and the first chamber volume estimation value by the estimator is acquired in a period of the predetermined opening value.

The vacuum valve comprises a second calibrator to sequentially fix the valve body opening to a plurality of opening values and operate the first effective exhaust rate based on a chamber pressure of the vacuum chamber measured at each of the plurality of opening values. The second calibrator calculates pressure response characteristics of the vacuum chamber based on the gas species characteristic value and the first chamber volume estimation value operated in the estimator and sets a time during which the valve body opening is fixed to each of the plurality of opening values based on the calculated pressure response characteristics.

According to the present invention, a chamber volume can be calculated regardless of a gas species of a gas to be introduced.

DETAILED DESCRIPTION OF THE EXEMPLARY EMBODIMENTS

Hereinafter, embodiments for carrying out the present invention will be described with reference to drawings.

First Embodiment

Figure 1:
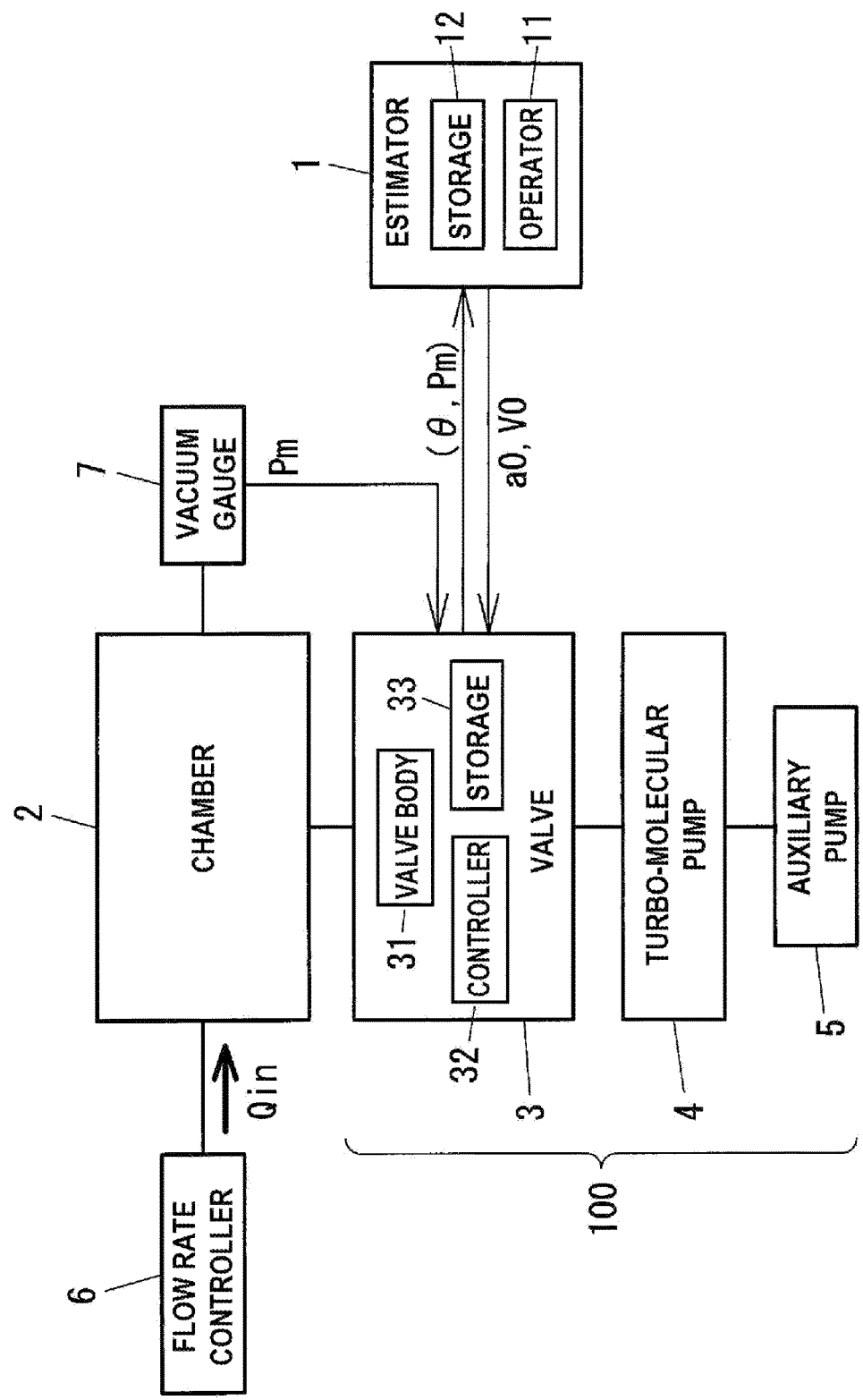
FIG. 1 is a view showing an example of a vacuum pumping system including an estimator.

FIG. 1 is a view showing an example of a vacuum pumping system including an estimator 1 of an embodiment. The vacuum pumping system includes a chamber 2 in which a process processing is performed. To the chamber 2, an automatic pressure adjusting valve 3 (hereinafter, simply referred to as a valve), a turbo-molecular pump 4, and an auxiliary pump 5 are connected as an exhaust system 100 for vacuum pumping the chamber 2. To the turbo-molecular pump 4 as a vacuum pump for high vacuum, the auxiliary pump 5 is connected on the exhaust side.

The valve 3 includes a valve body 31 which is driven open or closed, a controller 32, and a storage 33. The controller 32 is a digital operator which controls an opening or closing action of the valve body 31. The controller 32 is constituted by, for example, a microcomputer containing a central processing unit (CPU), a read-only memory (ROM), a random access memory (RAM), and an input/output interface (I/O interface), or a field programmable gate array (FPGA). The storage 33 is constituted by a RAM or a ROM and stores a program, data, and the like which are used for control. Although not shown, the valve 3 includes an opening measuring instrument (such as an encoder) which measures an opening (hereinafter, referred to as a valve body opening) θ of the valve body 31.

Into the chamber 2, a gas is introduced through a flow rate controller 6 such as a mass flow controller. A flow rate Qin of a gas introduced into the chamber 2 is controlled by the flow rate controller 6. A pressure of the chamber 2 is measured by a vacuum gauge 7, and the pressure measurement value Pm is input to the valve 3. The estimator 1 acquires a data pair (θ, Pm) consisting of a valve body opening θ and a pressure measurement value Pm from the valve 3 and stores the acquired data pair (θ, Pm) in a storage 12. Although details will be described later, in an operator 11 of the estimator 1, an estimation operation of a gas species characteristic value a0 and a chamber volume estimation value V0 is performed based on the acquired data pair (θ, Pm). The operated estimation value (a0, V0) is output to the valve 3. The controller 32 of the valve 3 performs a later-described calibration action based on the estimation value (a0, V0). The estimator 1 is constituted by, for example, a microcomputer containing a central processing unit (CPU), a read-only memory (ROM), a random access memory (RAM), and an input/output interface (I/O interface), or a field programmable gate array (FPGA).

An exhaust's expression represented by Expression (1) below holds between a flow rate Qin of a gas introduced into the chamber 2, and an effective exhaust rate Se of the exhaust system 100 connected to the chamber 2 and a pressure P of the chamber 2. In Expression (1), V is a volume of the chamber 2, and (dP/dt) is a time differentiation of a pressure P.

$$Qin = V \times (dP/dt) + Se \times P \tag{1}$$

As understood from Expression (1), a pressure P is influenced by a chamber volume V in a circumstance ((dP/dt)≠0) where a pressure P is changing. Also, when a pressure P of the chamber 2 is in an equilibrium state ((dP/dt)=0), an effective exhaust rate Se (=Qin/P) of the exhaust system 100 can be calculated from a pressure P and a flow rate Qin at that time.

Since a gas introduced into the chamber 2 passes through the chamber 2 and is exhausted by the exhaust system 100, an effective exhaust rate Se is influenced by a conductance of the chamber 2 which depends on the structure of the chamber 2. For example, even if a flow rate Qin is the same value, a pressure P is larger when the conductance of the chamber 2 is small than when the conductance is large.

In general, an effective exhaust rate of the exhaust system 100 constituted by a valve and a vacuum pump is represented by an effective exhaust rate synthetically calculated from a conductance C of the valve and an exhaust rate S of the vacuum pump. However, since an effective exhaust rate of the exhaust system 100 to the chamber 2 is also influenced by the structure of the chamber 2 as described above, a difference is generated between the synthetically calculated effective exhaust rate and an actual effective exhaust rate. Therefore, in the vacuum pumping system as shown in FIG. 1, it is common to perform, before the beginning of use, a calibration action for a volume of the chamber 2 and an effective exhaust rate of the exhaust system 100.

The calibration action includes a first calibration processing of operating a chamber volume and a second calibration processing of operating an effective exhaust rate of the exhaust system 100 at each opening position of the valve 3. In the first calibration processing, a chamber volume estimation value V0 estimated in the estimator 1 is applied to a chamber volume. In the second calibration processing, an effective exhaust rate is operated based on a pressure measurement value measured at each opening position. The above-described first calibration processing is omitted in the first embodiment.

The calibration action containing the estimation operation by the estimator 1 is performed in response to a command from a user. A user inputs a flow rate Qin of a gas introduced into the chamber 2 during the calibration action, as data used in the calibration action, to the valve 3 and the estimator 1. Alternatively, a flow rate Qin during the calibration action may be previously set to the valve 3 and the estimator 1, and a user may introduce a gas of the flow rate Qin into the chamber 2 according to the setting. A gas species of an introduced gas is not limited. That is, it is considered that in the valve 3 and the estimator 1, a gas flow rate is known, but a gas species is unknown.

(Description of Estimation Operation in Estimator 1)

Figure 2:
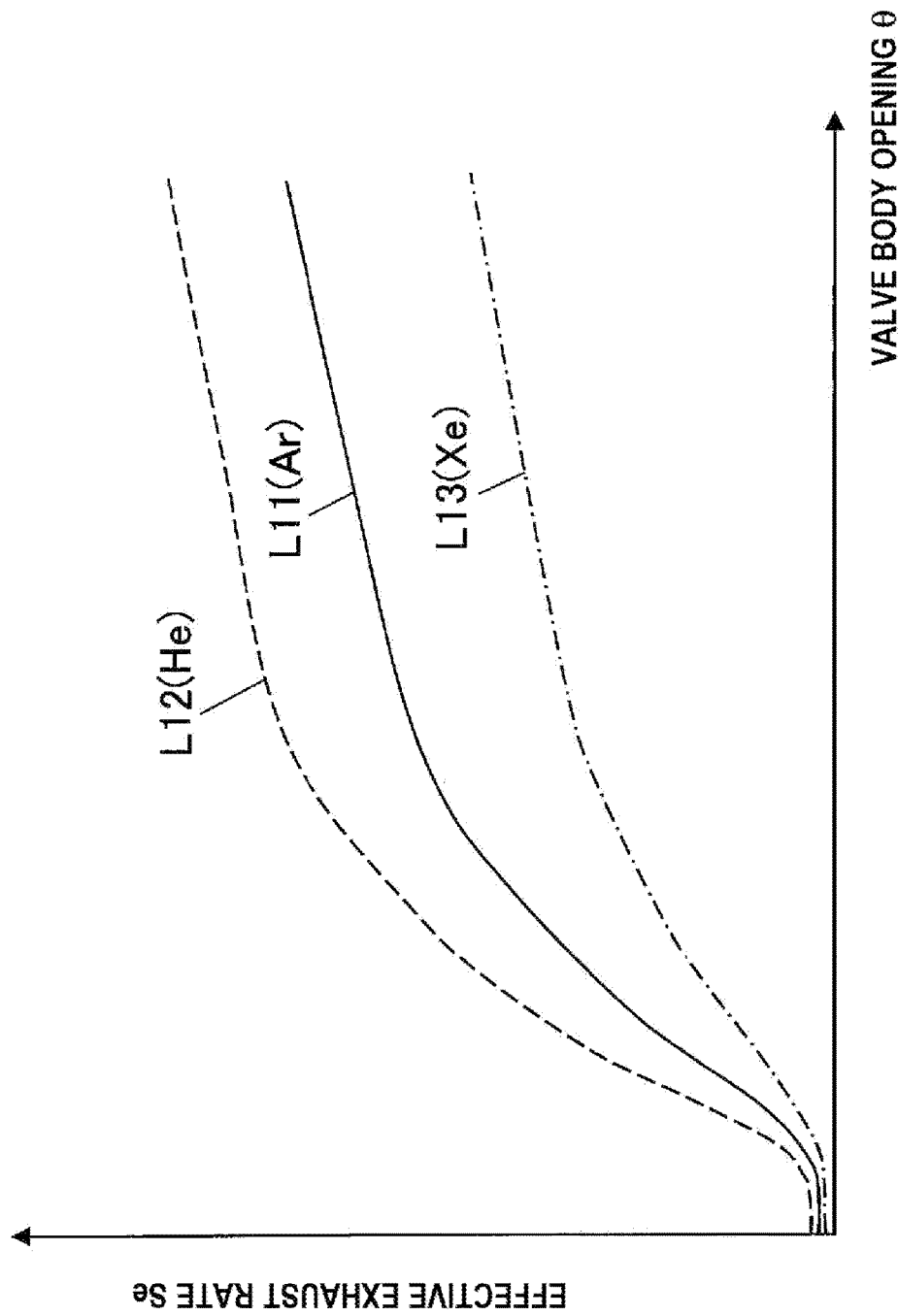
FIG. 2 is a view showing a relationship between an effective exhaust rate and a valve body opening when a gas species is varied.

The estimation principle of a gas species characteristic value a0 and a chamber volume estimation value V0 in the estimator 1 will be described. The estimation operation in the estimator 1 is performed based on a pressure measurement value Pm in a circumstance (during a pressure response) where a pressure P of the chamber 2 is changing. As described above, Exhaust's Expression (1) holds for a pressure P. Since the conductance of the valve 3 changes depending on a valve body opening θ, an effective exhaust rate Se of the exhaust system 100 with respect to a change of the valve body opening θ is indicated by, for example, a monotonically increasing curve as shown in FIG. 2.

An effective exhaust rate Se of the exhaust system 100 is also dependent on a gas species. In FIG. 2, line L11 indicates an effective exhaust rate Se when an argon (Ar) gas is exhausted, line L12 indicates an effective exhaust rate Se when a helium (He) gas is exhausted, and line L13 indicates an effective exhaust rate Se when a xenon (Xe) gas is exhausted. It is noted that although an effective exhaust rate Se is also influenced by a flow rate Qin, the influence is smaller than that by a valve body opening θ. Therefore, hereinafter, an effective exhaust rate Se is regarded as a function of only a valve body opening θ and presented by Se(θ).

A conductance C(θ) representing a correlation between a valve body opening θ and a conductance value of the valve 3 can be generally obtained as information from a valve manufacturer for a specific gas species (hereinafter, referred to as a standard gas). The storage 33 of the valve 3 previously stores, as an effective exhaust rate of the exhaust system 100, an effective exhaust rate which is synthetically calculated from a conductance C(θ) and an exhaust rate of the turbo-molecular pump 4 for a standard gas. The effective exhaust rate stored in the storage 33 is stored as correlation data associating a valve body opening θ with an effective exhaust rate. Hereinafter, the correlation data is denoted by Se standard(θ), and Se standard(θ) is referred to as an effective exhaust rate. It is noted that an influence by the structure of the chamber 2 is not taken into account in this synthetically calculated effective exhaust rate Se standard(θ).

In contrast to Se standard(θ) for a standard gas, an effective exhaust rate for a calibration gas used in calibration is defined as Se calibration(θ), and Se calibration(θ) is represented by Expression (2) below.

$$Se\ \text{calibration}(\theta) = a \times Se\ \text{standard}(\theta) \quad (2)$$

Coefficient a in Expression (2) represents a ratio between an effective exhaust rate for a calibration gas and an effective exhaust rate for a standard gas. Hereinafter, coefficient a is referred to as a gas species characteristic value. When the same gas species as a standard gas is used as a calibration gas, a gas species characteristic value a comes to a=1. As described above, Se calibration(θ) and Se standard(θ) are both an effective exhaust rate of a discrete exhaust system synthetically calculated from a conductance of the valve 3 and an exhaust rate of the turbo-molecular pump 4, and do not take the structure of the connected chamber 2 into account, like an effective exhaust rate Se in Exhaust's Expression (1).

At a low opening having a narrow valve body space through which a gas passes, a conductance C(θ) of the valve 3 can be generally regarded as a conductance of a molecular flow region, and the conductance C(θ) is represented by $C(\theta) \propto 1/\sqrt{M}$ using a molecular weight M of a gas. Also, an effective exhaust rate of the exhaust system 100 is also dominated by a conductance C(θ) of the valve 3. Therefore, regarding the magnitude of an effective exhaust rate, the proportional relationship of $C(\theta) \propto 1/\sqrt{M}$ in a case of a conductance C(θ) is reduced, but the magnitude relationship becomes similar to the magnitude of $1/\sqrt{M}$ in a wide opening range. That is, it may be said that a gas species characteristic value a is a parameter representing a gas species having a tendency of $a \propto 1/\sqrt{M}$. When a×Se standard(θ) of Expression (2) is applied to effective exhaust rate Se of Expression (1), Expression (1) comes to Expression (1A).

$$Qin = V \times (dP/dt) + a \times Se\ \text{standard}(\theta) \times P \quad (1A)$$

In the estimator 1, an estimation operation of a gas species characteristic value and a chamber volume estimation value is performed using Expression (1A). The result of the estimation operation is denoted by a gas species characteristic value a0 and a chamber volume estimation value V0. In the estimation operation, a flow rate Qin (known) and a pressure measurement value Pm during calibration are used as a flow rate Qin and a pressure P respectively. Also, a difference value of the pressure measurement value Pm is substituted for (dP/dt).

As Se standard(θ), Se standard(θ) synthetically calculated from a conductance C(θ) and an exhaust rate of the turbo-molecular pump 4 for a standard gas previously stored in the storage 33 of the valve 3 may be used. When the valve body opening θ during pressure measurement is small, a conductance C(θ) may be used. A conductance C(θ) and Se standard(θ) are previously stored in the storage 33 of the valve 3, and the estimator 1 acquires, from the valve 3, a conductance C(θ) and Se standard(θ) used in an estimation operation and previously stores the acquired data in the storage 12. Also, a user may store a conductance C(θ) and Se standard(θ) in the storage 12 of the estimator 1.

As described above, in Expression (1A), a known flow rate is used for Qin, a pressure measurement value Pm for P, and a difference value calculated from a pressure measurement value Pm for (dP/dt). For Se standard(θ), a value calculated from a valve body opening θ acquired from the valve 3 and correlation data stored in the storage 33 is used. As a result, it can be interpreted that Expression (1A) is an expression with a and V as variables. Also, one type of gas or a mixed gas containing a plurality of gases is used as a calibration gas. During a calibration action, the gas species and the mixture ratio do not change and are constant, and a chamber volume V is also constant. Therefore, it is understood that even when a measured P and (dP/dt) change, a and V come to constant values a0 and V0 which satisfy Expression (1A).

Geometrically described, at an optional time in a process in which a chamber pressure (pressure measurement value) temporally changes during a calibration processing, coefficients of a and V change with time while Expression (1A) always holds. Therefore, straight lines indicated by Expression (1A) in (a, V) coordinates vary in their inclination and intercept with time. However, all of the straight lines intersect at one point (a0, V0). In brief, (a0, V0) is a gas species characteristic value and a chamber volume estimation value to be obtained.

It is noted that although an estimation operation of (a0, V0) is performed based on a pressure measurement value Pm during a pressure response in a state in which a valve body opening θ is fixed in the present embodiment, an estimation value (a0, V0) is similarly obtained even with a pressure measurement value Pm in a circumstance where a valve body opening θ is changing. That is, an operation of a gas species characteristic value a0 and a chamber volume estimation value V0 in the estimator 1 can be applied not only when a valve body opening θ of an input data pair (θ, Pm) is constantly fixed but also when a valve body opening θ is changing.

Figure 3:
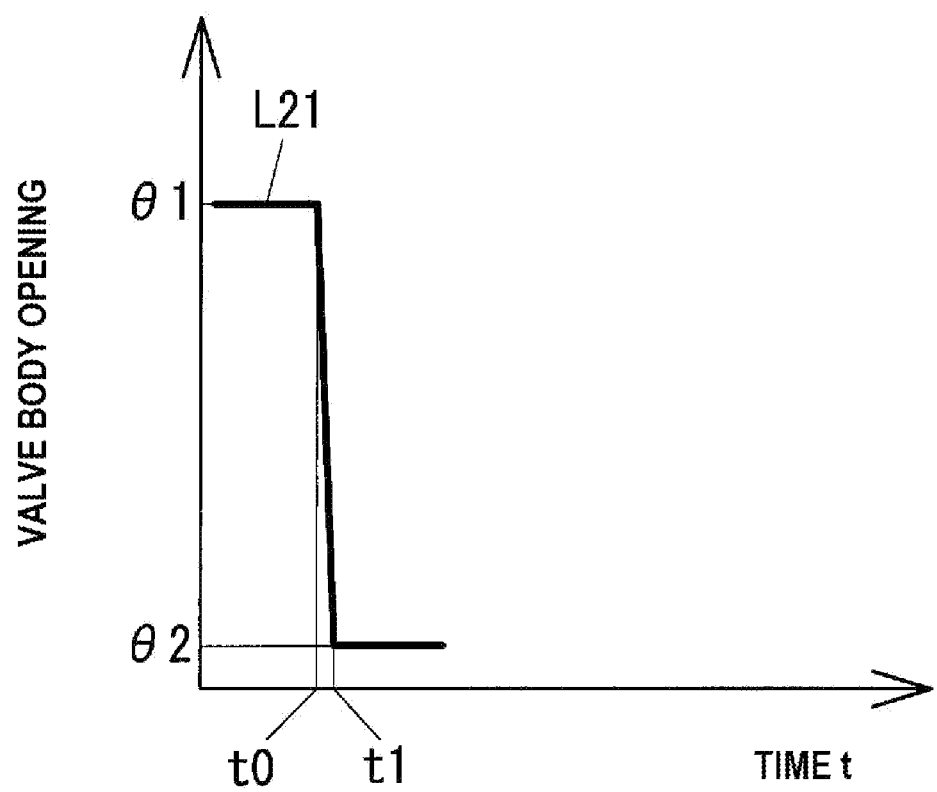
FIG. 3 is a view showing an opening change of a valve body opening.

In general, a measurement value has an error. Especially, a first order differential value (dP/dt) of a pressure has a large error due to the influence of noises because it is obtained from a difference value of a pressure measurement value Pm, and the above-described intersection (a0, V0) cannot exist strictly. Therefore, a statistically probable intersection is estimated. First, a plurality of pressure measurement values Pm is sampled during a response. For example, a valve body opening θ is switched from θ1 (for example, maximum opening θmax) to θ2 (for example, minimum opening θmin) over a time from t0 to t1 as shown in line L21 of FIG. 3, and a plurality of pressure measurement values Pm is measured during the pressure response to acquire a plurality of samples k (k=1, 2, 3, . . . , K) corresponding to a plurality of data pairs (θ, Pmk). Line L22 of FIG. 4 indicates a pressure response, and a plurality of pressure measurement values Pmk is measured during a response initial period Δt0.

A sample k corresponds to one straight line indicated by Expression (1A). When the sampling time of a sample k is tk, and the valve body opening at tk is denoted by θ|t=tk, a sample k contains Se standard (θ|t=tk)×P|t=tk as a coefficient of a in Expression (1A), (dp/dt|t=tk) as a coefficient of V, and constant term Qin|t=tk. An expression for distances between K straight lines on (a, V) coordinates corresponding to K samples k and a point (a0, V0) is derived, and each distance is defined as Lk. Although a formulated expression is omitted, an expression can be formulated by eliminating (a, V) and treating (a0, V0) as an unknown. Then, it can be said that (a0, V0) minimizing a sum ($\Sigma Lk^2$) of squares of distances Lk is a statistically probable, appropriate intersection. For obtaining this, simultaneous equations in which values obtained by partially differentiating ($\Sigma Lk^2$) with respect to a0 and V0 come to 0 are solved, similarly to in a case of a least squares method. It is noted that a method for obtaining (a0, V0) from a plurality of data pairs (θk, Pmk) is not limited to the method described herein, and the estimation operation may be performed by another method.

(Measurement Period of Multiple Pressure Measurement Values Pmk)

Figure 4:
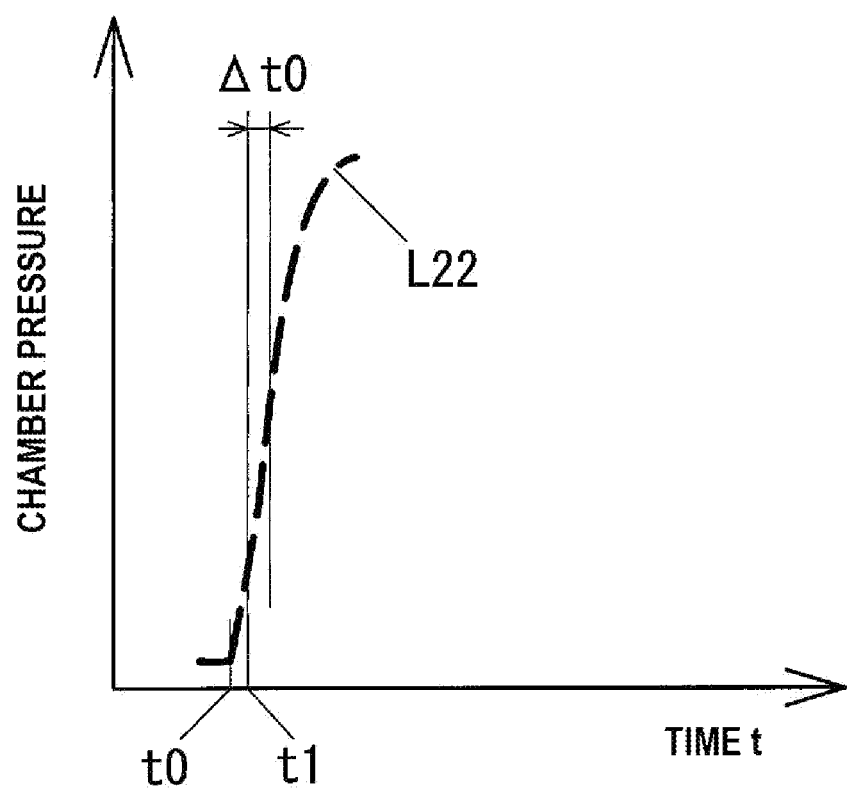
FIG. 4 is a view showing an example of a pressure response when a valve body opening changes in a stepwise manner as in FIG. 3.

Since the pressure measurement value Pmk is any value measured during a pressure response period, the response initial period Δt0 in FIG. 4 can be optionally set within a pressure response period. For example, it may be a short period of about equal to or less than 1 time a time constant τ (=V/Se (θ2)) at an opening θ2. However, a gas species and a chamber volume as well as a time constant τ are unknown at the beginning of estimation. Therefore, an upper limit τmax (=Vmax/{amin×Se standard (θ2)}) of a time constant τ is previously determined using an assumed gas species characteristic value amin based on the assumption that a molecular weight is sufficiently large and an assumed volume upper limit value Vmax of the chamber 2, and this previously determined upper limit is defined as a longest time (time-out time).

When (a0, V0) has converged to a certain value as an estimation operation proceeds, it is judged that the value has been confirmed, and the estimation operation is ended. In brief, when a light gas species is flown, and the chamber volume is small, the processing can be completed in a fraction of a time-out time. Even when there are many noises in a pressure measurement system, an influence of random noises can be reduced by increasing measurement timings within a short period to increase the number of samples applied to an estimation operation. It is noted that when a time-out time has been reached before the operation ends, the convergence result obtained until that time is applied as an estimation value a0, V0 to the subsequent step.

(Description of Calibration Action)

Next, the calibration action in the first embodiment will be described. As previously described, the calibration action of the exhaust system 100 generally includes a first calibration processing of operating a chamber volume estimation value V1 and a second calibration processing of operating an effective exhaust rate Se. In the first embodiment, the first calibration processing is omitted by applying a chamber volume estimation value V0 obtained by the estimation operation in the estimator 1 to a chamber volume estimation value V1, and the second calibration processing of operating an effective exhaust rate Se is performed.

Figure 5:
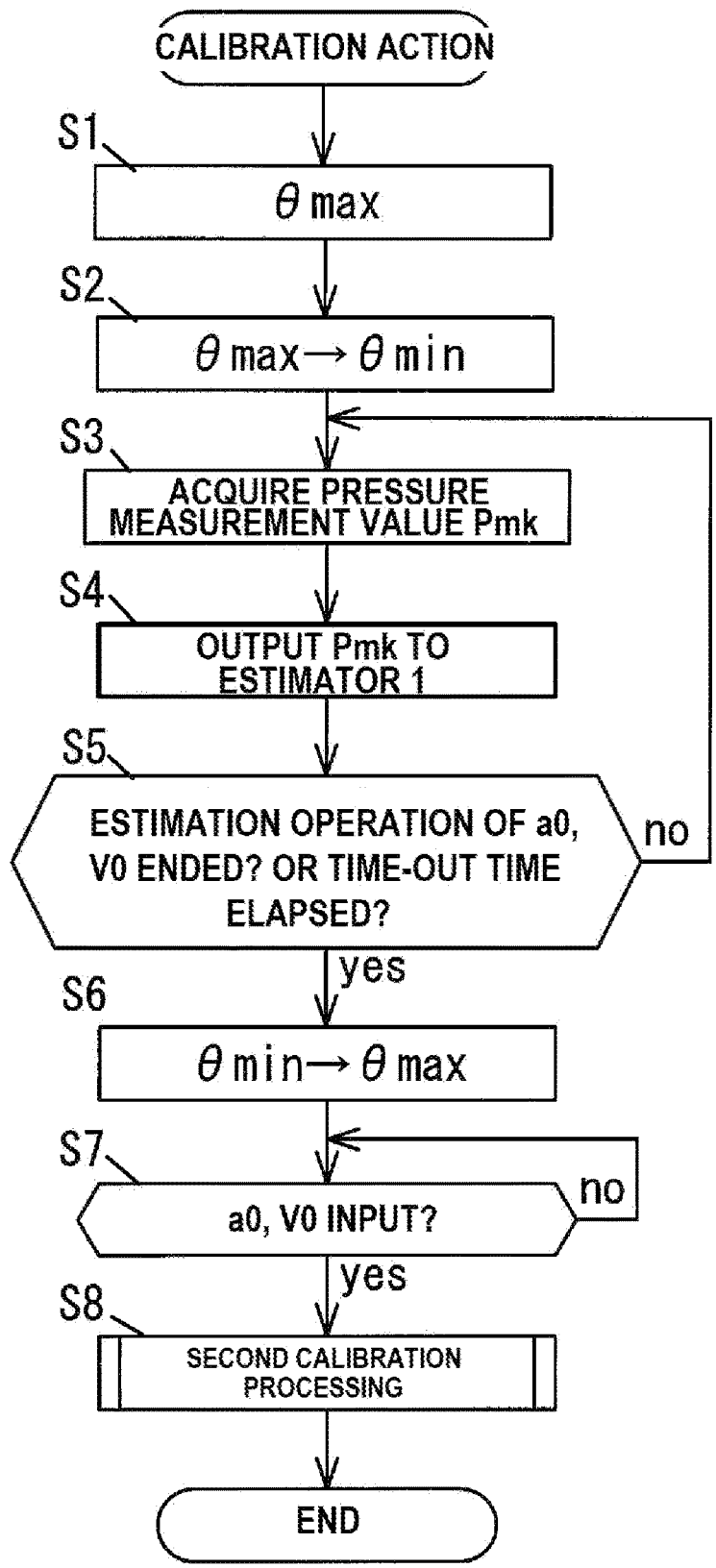
FIG. 5 is a flowchart showing a calibration processing procedure in a first embodiment.
Figure 6:
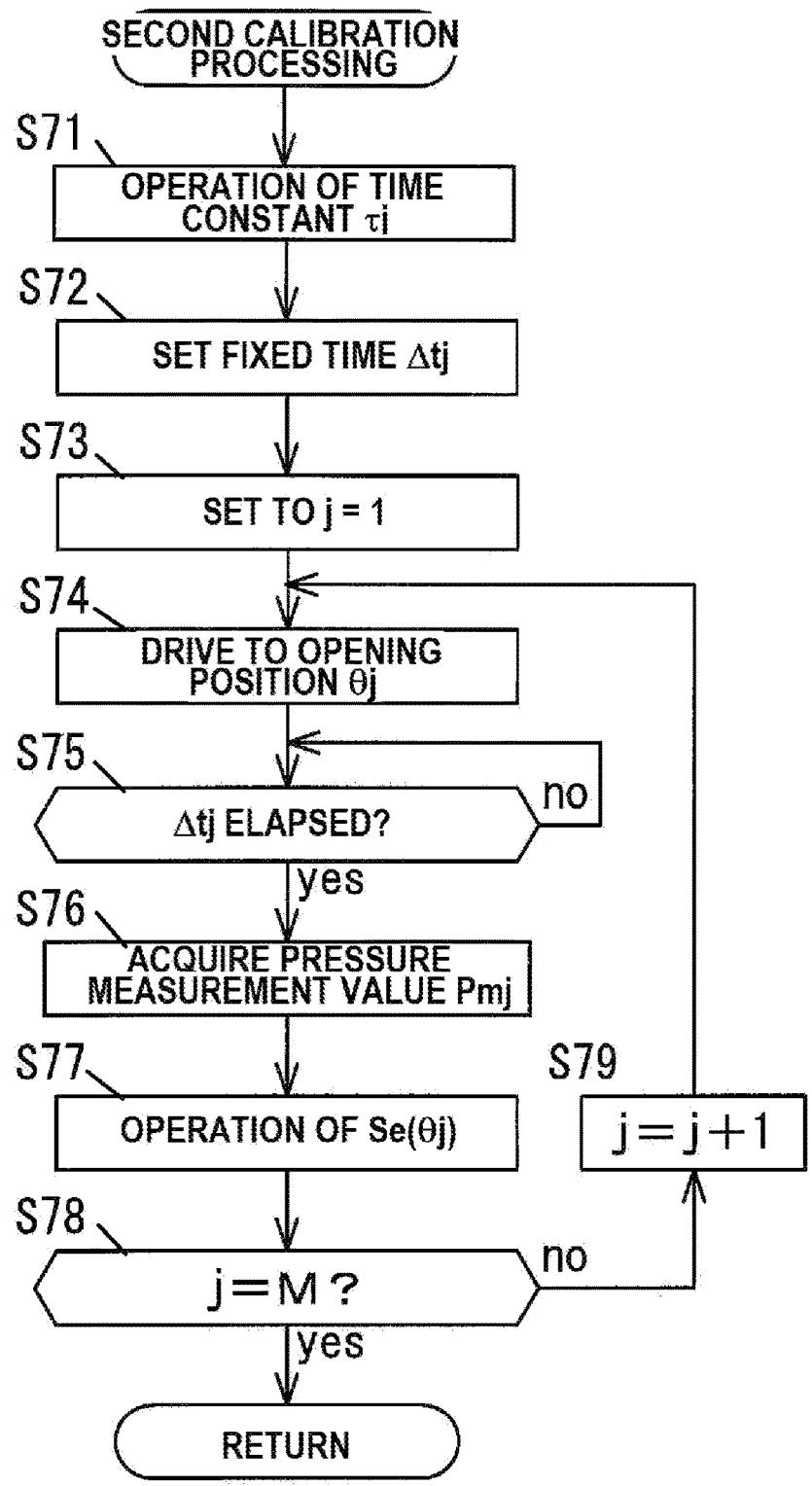
FIG. 6 is a flowchart showing an example of a second calibration processing.
Figure 7:
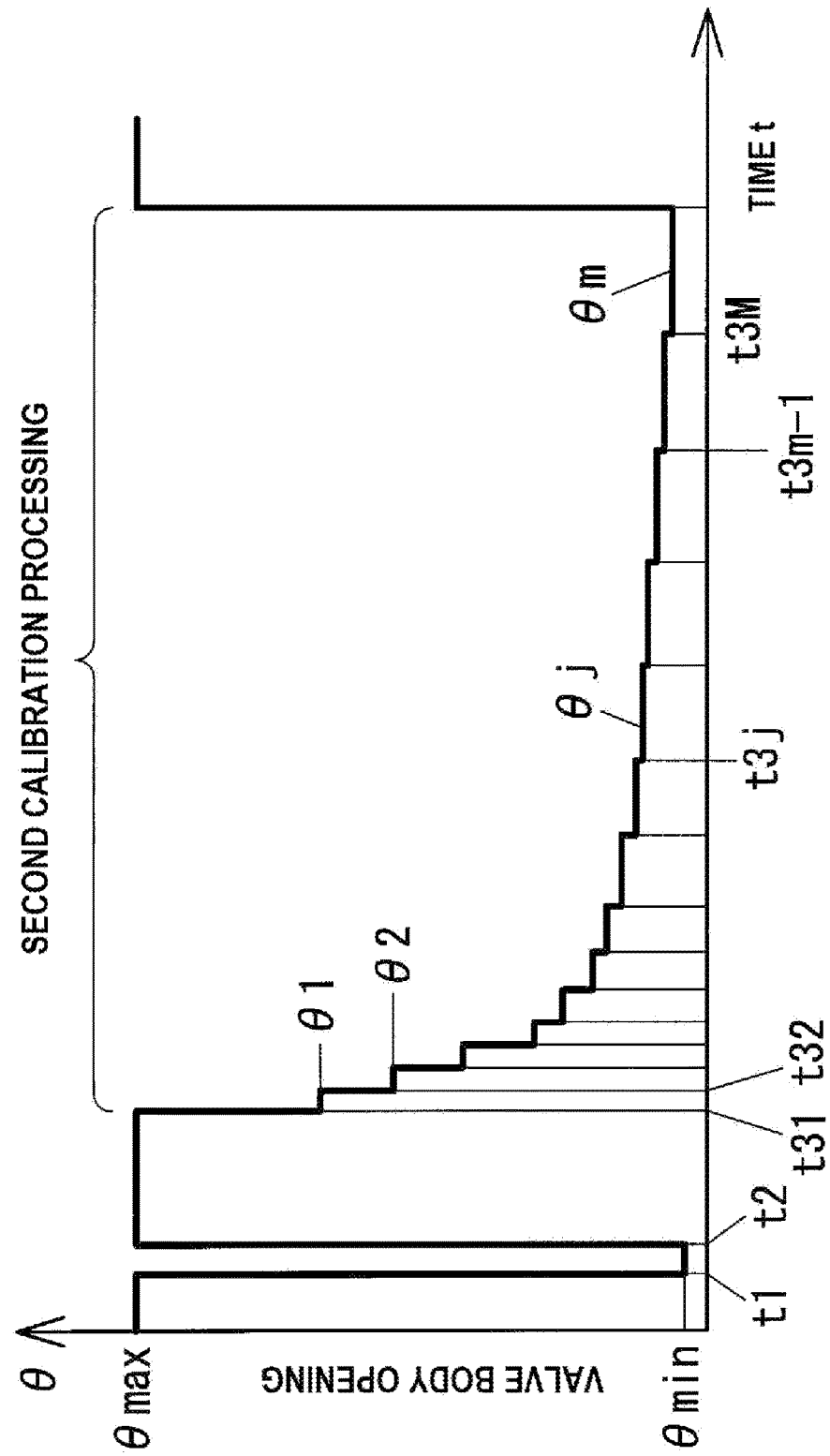
FIG. 7 is a view showing a transition of a valve body opening θ in a calibration action.
Figure 8:
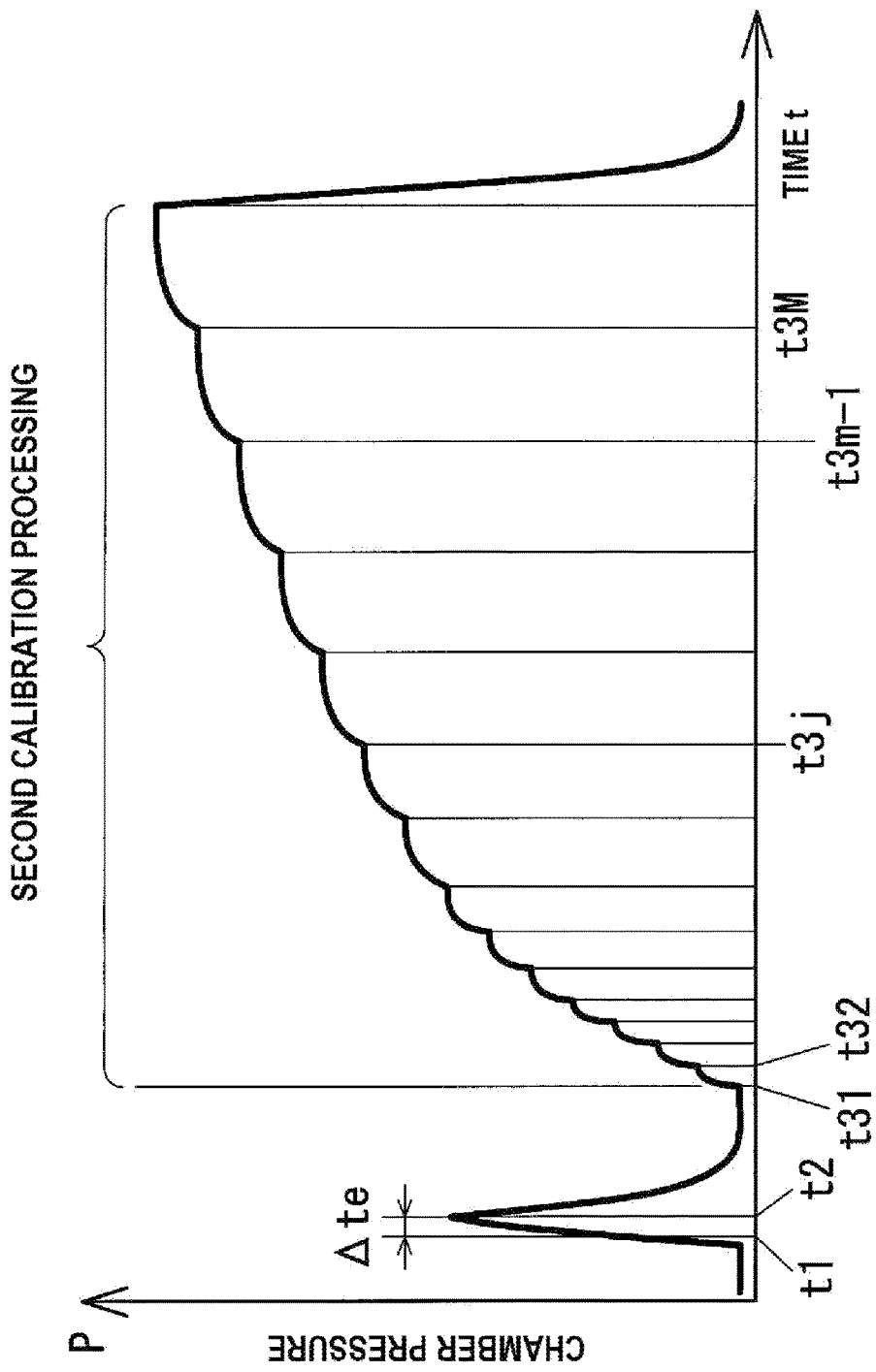
FIG. 8 is a view showing a transition of a pressure P of a chamber in a calibration action.

FIGS. 5 and 6 are each a flowchart showing a calibration processing procedure in the first embodiment. A user introduces a calibration gas having a previously specified flow rate Qin into the chamber 2 and thereafter inputs, to the valve 3, a command to start a calibration action so that a calibration action starts. In response to the input of a command to start a calibration action, the controller 32 (see FIG. 1) of the valve 3 executes a calibration processing program for the processings in FIGS. 5 and 6 stored in the storage 33. FIG. 7 is a view showing a transition of a valve body opening θ in the calibration action. FIG. 8 is a view showing a transition of a chamber pressure P.

The controller 32 sets a valve body opening θ to a maximum opening θmax for temporarily decreasing a pressure of the chamber 2 in Step S1 of FIG. 5 and thereafter switches a valve body opening θ into a minimum opening θmin in Step S2. As a result, a pressure P of the chamber 2 has already started rising at time t1 when an estimation processing starts, as shown in FIG. 8. In Step S3, a plurality of pressure measurement values Pmk is acquired chronologically. In Step S4, the plurality of pressure measurement values Pmk acquired in Step S3 is output to the estimator 1. In the estimator 1, a gas species characteristic value a0 and a chamber volume estimation value V0 are operated based on the plurality of pressure measurement values Pmk, as described above.

In Step S5, it is decided if each (a0, V0) has converged to a predetermined certain level or if a time-out time has elapsed. When it is judged in Step S5 that (a0, V0) has not converged to a certain level or that a time-out time has not elapsed, the processing returns to Step S3. On the other hand, when it is judged in Step S5 that (a0, V0) has converged to a certain level, it is determined that a value has been confirmed when (a0, V0) has converged to a certain level, and the operation processing is ended. Alternatively, when it is judged that a time-out time has elapsed, the operation result obtained until that time is applied as a confirmed value (a0, V0) to the subsequent step.

Next, when a valve body opening θ is switched to a maximum opening θmax (time t2) in Step S6, a pressure P decreases as shown in FIG. 8 and rapidly approaches an equilibrium pressure at a maximum opening θmax. In Step S7, it is decided if a gas species characteristic value a0 and a chamber volume estimation value V0 have been input from the estimator 1. When it is judged in Step S7 that they have been input, the processing proceeds to Step S8 to execute the second calibration processing. In FIG. 8, a period indicated by Δte is an estimation processing period of (a0, V0).

FIG. 6 is a flowchart showing details of a second calibration processing. In the second calibration processing, as shown in FIG. 7, drive of a valve body opening θ is stopped in a stepwise manner at a plurality of opening positions θj (j=1, 2, . . . , M), and an effective exhaust rate Se (θj) at each the opening position θj is operated based on a pressure measurement value Pmj acquired while stopped and a known flow rate Qin. It is noted that a general solution of the above-described Exhaust's Expression (1) is represented by Expression (2) below, and Expression (2) comes to Expression (3) when a flow rate Qin is constant. P0 is an initial pressure, and a pressure P increases or decreases from an initial pressure P0 as time elapses.

[Mathematical Formula 1]

$$P(t) = P0 \times \exp\left\{\left(-\frac{Se}{V}\right) \times t\right\} + \left(\frac{1}{V}\right) \times \int_0^t Qin(\tau) \times \exp\left\{\left(-\frac{Se}{V}\right) \times (t-\tau)\right\} d\tau \quad (2)$$

$$P(t) = [Qin/Se + (P0 - Qin/Se) \times \exp\{-(Se/V) \times t\}] \quad (3)$$

Figure 9:
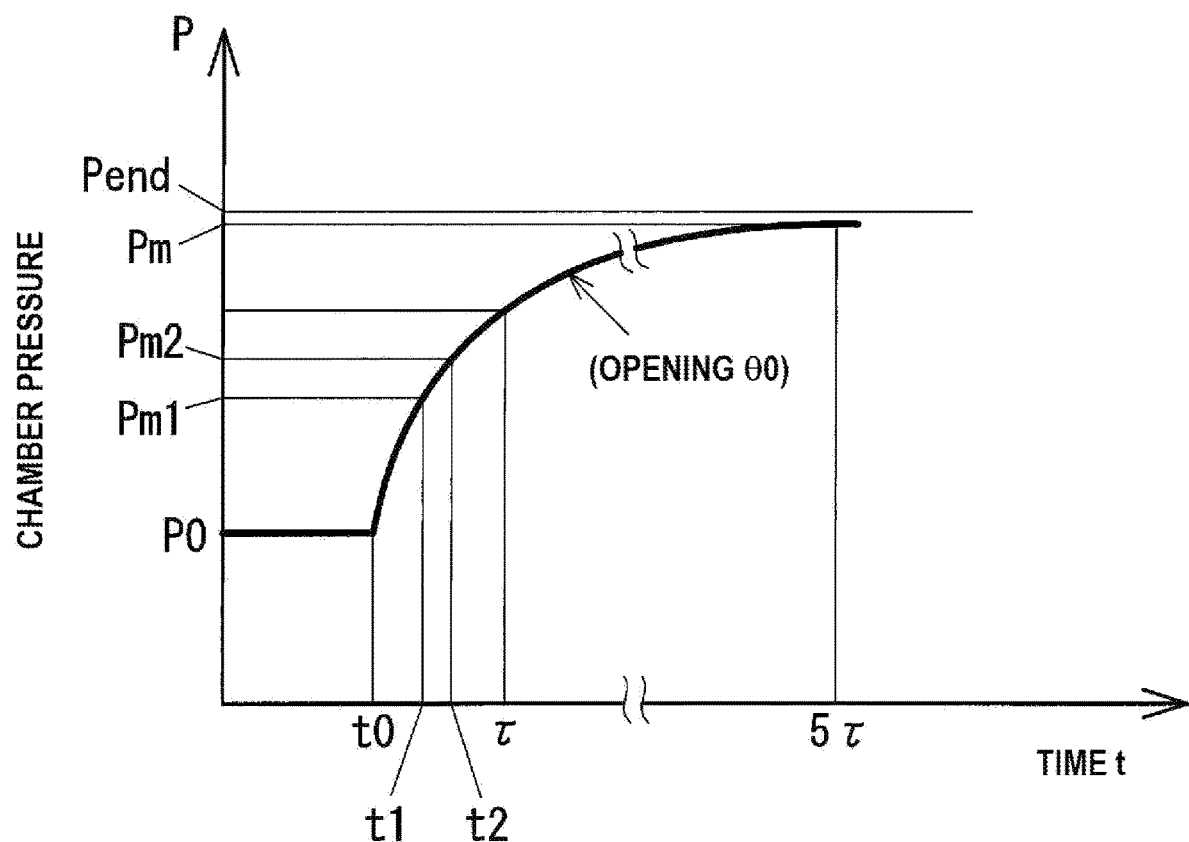
FIG. 9 is a view showing a pressure change when a valve body opening θ is driven from large to small.

When drive of a valve body opening θ is stopped at an opening position θ0 in a direction in which an opening decreases in the second calibration processing, a pressure P changes starting from time t0 (pressure P0) at which a valve body opening θ has been changed to an opening position θ0, in accordance with Expression (3) as shown in FIG. 9. In an equilibrium state after a sufficient time has elapsed, a pressure P comes to equilibrium pressure P=Qin/Se(θ0). In this case, a time constant τ as a pressure response characteristic is τ=V/Se(θ0). Using the calculated gas species characteristic value a0 and chamber volume estimation value V0, a time constant τj when a valve body opening θ is stopped at an opening position θj is calculated according to Expression (4) below. Se standard(θj) is larger as a valve body opening θj is larger. Accordingly, a time constant τj is smaller as a valve body opening θj is larger.

$$\tau j = V0 / \{a0 \times Se \text{ standard}(\theta j)\} \quad (4)$$

In Step S71 of FIG. 6, a time constant τj corresponding to each previously set opening position θj is operated according to Expression (4). In Step S72, a fixed time Δtj, as a stop duration during which a valve body opening θ is stopped at an opening position θj, is set for each opening position θj, based on the time constant τj calculated in the Step S71. A fixed time Δtj is set to a time taken until a pressure considered as an equilibrium pressure is reached, for example, to constant times a time constant τj. The constant times is desirably set to about 5 times, so that an equilibrium pressure can be measured at each opening position θj. When a fixed time Δtj is set to 5 times a time constant τj, a pressure P reaches about 99% of an equilibrium pressure. When emphasis is placed on shortening a processing time of the second calibration processing more than on accuracy of an effective exhaust rate Se obtained by an estimation operation, a fixed time Δtj may be set to 4 times a time constant. Even in this case, a pressure P also reaches about 98% of an equilibrium pressure.

Also, a ratio of a time constant when an assumed gas species has a molecular weight of about 2 to 200, and an assumed chamber volume is 2 (L) to 200 (L), relative to a time constant when a standard gas species is set to Ar (M=40), and a standard chamber volume is set to 20 (L), varies by triple digits ranging from 0.022 to 22. Therefore, practically, a fixed time Δtj at each opening position θj may be limited by an upper limit and a lower limit with maximum value Tmax, minimum value Tmin. For example, a fixed time Δtj is set to Δtj=max(Tmin, min(Tmax, 5×τj(θj))).

Next, when j is set to initial value j=1 in Step S73, a valve body opening θ is driven to an opening position θj in Step S74. In Step S75, it is decided if a time during which a valve body opening θ stops at an opening position θj has exceeded the fixed time Δtj set in Step S72. When it is judged in Step S75 that the stop time has exceeded the fixed time Δtj, the processing proceeds to Step S76 to acquire a pressure measurement value Pmj. In Step S77, an effective exhaust rate Se(θj) at a valve body opening θj is calculated from a known flow rate Qin and the acquired pressure measurement value Pmj according to Se(θj)=Qin/Pmj.

In Step S78, it is decided if j has reached a predetermined number M. If j=M, the second calibration processing of FIG. 6 is performed, and the processing returns to FIG. 5 to end the calibration action. On the other hand, if it is judged in Step S78 that j<M, the processing proceeds to Step S79 to add 1 to j and thereafter returns to Step S74. In this manner, through the second calibration processing shown in FIG. 6, an effective exhaust rate Se(θj) is calculated at each of M opening positions θj (j=1, 2, . . . , and M).

The previously-described invention according to Patent Literature 1 is based on the premise that a flow rate Qin is known, and a gas species is a specific gas. Therefore, the invention had a problem in that a gas species usable during calibration is limited to the specific gas. On the other hand, in the above-described first embodiment, an estimation operation of a chamber volume estimation value V0 can be performed, even when any gas species is used as a calibration gas, for example, even when a gas species is known, or a mixed gas or a process gas is used as a calibration gas.

Furthermore, in the first embodiment, an estimation operation of a gas species characteristic value a0 and a chamber volume estimation value V0 is possible. Therefore, a time constant τj=V0/{a0×Se standard(θj)} in the second calibration processing is calculated based on the obtained gas species characteristic value a0 and chamber volume estimation value V0, and a fixed time Δtj can be most suitably set from the time constant τj. As a result, a second calibration processing period can be shortened while preventing accuracy of the operation of an effective exhaust rate from decreasing.

In the operation method of an effective exhaust rate described in Patent Literature 1, an effective exhaust rate is calculated from a calculated chamber volume, a difference value of a pressure measurement value, and a gas flow rate. However, since only a specific gas species is usable as a calibration gas, an effective exhaust rate can be calculated only for a specific gas species. In this case, a difference value of a pressure measurement value is used. Therefore, a processing time for calculation is short, but the calculation is susceptible to noises of pressure measurement and deteriorates in accuracy. That is, even when calibration is performed with a gas of a specific gas species, accuracy deteriorates.

On the other hand, in the first embodiment, an effective exhaust rate was calculated from a pressure measurement value Pmj when a pressure P almost reached an equilibrium pressure while a valve body opening was fixed, a flow rate Qin, and expression "Se=Qin/Pmj". Therefore, compared to when a difference value of a pressure measurement value is used as in Patent Literature 1, a processing time is lengthened, but operation accuracy is enhanced. For ensuring accuracy of pressure control, an accurate effective exhaust rate is preferable.

It is noted that in the above-described embodiment, the second calibration processing of performing an operation of an effective exhaust rate Se(θj) at each opening position θj includes stopping a valve body opening θ during a fixed time Δtj to acquire a pressure measurement value Pmj as an equilibrium pressure and then performing an operation of an effective exhaust rate Se(θj). However, the calculation method disclosed in Patent Literature 1 may be adopted as the second calibration processing. In that case, since (a0, V0) is obtained through an estimation operation by the estimator 1, and a gas species and a chamber volume are known, the calculation method of Patent Literature 1 can be adopted as it is. Also, a fixed time Δtj is set to about 1 time a time constant τj, for example, Δtj=max(Tmin, min(Tmax, 1×τj(θj))).

In the first embodiment, a time constant τj was calculated from a gas species characteristic value a0 and a chamber volume estimation value V0 obtained through an estimation operation by the estimator 1, and a fixed time Δtj was most suitably set based on the time constant τj at each opening position. On the other hand, when a time constant τj in a calibration gas is unknown, a problem is that for reasons of necessity to sufficiently ensure a time from the fixing of a valve body opening θ to the achievement of an equilibrium pressure, a waiting time while an opening is fixed is likely to be lengthened, compared to when a fixed time Δtj is set from a time constant τj based on an estimation value (a0, V0).

For example, when a gas species and a chamber volume are unknown, a possible longest upper limit value τmax is necessary to be used as a time constant τ when waiting until an equilibrium pressure is reached. That is, since a time constant τ depends on a chamber volume and an effective exhaust rate, an upper limit value τmax among time constants τ calculated from gas species which a user may use and chamber volumes is used. A time constant τj is longer as a chamber volume V is larger and as an effective exhaust rate Se is smaller. As previously described, an effective exhaust rate Se at a minimum opening θmin is substantially the same as a conductance C(θ) of the valve 3, and the conductance C(θ) is represented by C(θ)∝1/$\sqrt{M}$. As a gas species has a larger molecular weight, an effective exhaust rate Se(θmin) at a minimum opening θmin is smaller, and a time constant τ is further longer.

For example, when a gas having a possible largest molecular weight M which a user may use is Xe (M=131), a time constant upper limit value τmax is set based on an assumed effective exhaust rate Se(θmin) for an Xe gas. For a chamber volume, a possible volume upper limit value Vmax is used. That is, a fixed time Δt is set on the premise that time constant upper limit value τmax=Vmax/Se(θmin).

Therefore, when circumstances (a chamber volume and a gas species) in a user are close to setting circumstances of a time constant upper limit value τmax, it can be said that a time constant upper limit value τmax is appropriate as a time constant for setting a fixed time Δt. However, when a volume of a chamber to be calibrated is smaller than an assumed volume upper limit value Vmax, and a used gas species is a light gas (for example, He (M=4)) with respect to an assumed gas species (for example, Ar (M=40)), a most suitable time constant τ is shorter than a time constant upper limit value τmax, and an unnecessarily long time comes to be spent for calibration.

On the other hand, in the first embodiment, a time constant τj is obtained from a gas species characteristic value a0 and a chamber volume estimation value V0 calculated by the estimator 1, and a fixed time Δtj is set based on the time constant τj at each opening position. Therefore, a fixed time Δtj most suitable for circumstances (a chamber volume and a gas species) of a user can be set. For example, since a gas species characteristic value is proportional to 1/$\sqrt{M}$, a gas species characteristic value of a He (M=4) gas comes to about 6 times the gas species characteristic value of Xe (M=131). Accordingly, a time constant in a case of a He gas comes to about ⅙ the time constant in a case of a Xe gas, and a time of the second calibration processing period is shortened by the shortened time of a time constant.

Second Embodiment

As previously described, the calibration action of the valve 3 includes a first calibration processing of operating a chamber volume estimation value V1 and a second calibration processing of operating an effective exhaust rate Se. In the first embodiment, the first calibration processing was omitted by applying a chamber volume estimation value V0 estimated by the estimator 1 to a chamber volume estimation value V1. On the other hand, in the below-described second embodiment, the first calibration processing and the second calibration processing are performed as a calibration action. Before the first and second calibration processings are performed, an estimation operation of a gas species characteristic value a0 and a chamber volume estimation value V0 by the estimator 1 is performed, and a fixed time Δt when performing an action of stopping drive of the valve body 31 in the first and second calibration processings was most suitably set based on a time constant τ calculated using the estimation value (a0, V0). The second calibration processing in the second embodiment is the same as in the first embodiment, and description of the processing method is omitted.

(First Calibration Processing)

First, a first calibration processing of obtaining a chamber volume estimation value V1 through an operation will be described. In the second embodiment, a gas species of a calibration gas is not limited to the above-described standard gas, and a gas species corresponding to circumstances of a user can be used, in the same manner as in the first embodiment. As described in FIG. 9, a pressure response when a valve body opening θ has changed in a stepwise manner to an opening position θ0 is represented by Expression (5). Se(θ0) is an effective exhaust rate at an opening position θ0.

$$P(t)=[Qin/Se(\theta 0)+(P0-Qin/Se(\theta 0))\times\exp\{-(Se(\theta 0)/V)\times t\}] \quad (5)$$

In FIG. 9, pressure measurement values at optional times t1 and t2 during a response in which a pressure is changing are defined as Pm1 and Pm2 respectively. Then, a chamber volume value V is calculated according to Expression (6) by substituting these values for Expression (5). In Expression (6), Pend is an equilibrium pressure at an opening position θ0 and has a relationship of Se(θ0)=Qin/Pend. As an equilibrium pressure Pend, a pressure measurement value Pm after a sufficient time has elapsed since a valve body opening θ was stopped at an opening position θ0 can be used.

$$V1=Se(\theta 0)\times(t2-t1)/\ln\{(Pm1-Pend)/(Pm2-Pend)\} \quad (6)$$

In this manner, according to Expression (6), a chamber volume estimation value V1 can be calculated regardless of a gas species of a calibration gas.

Figure 10:
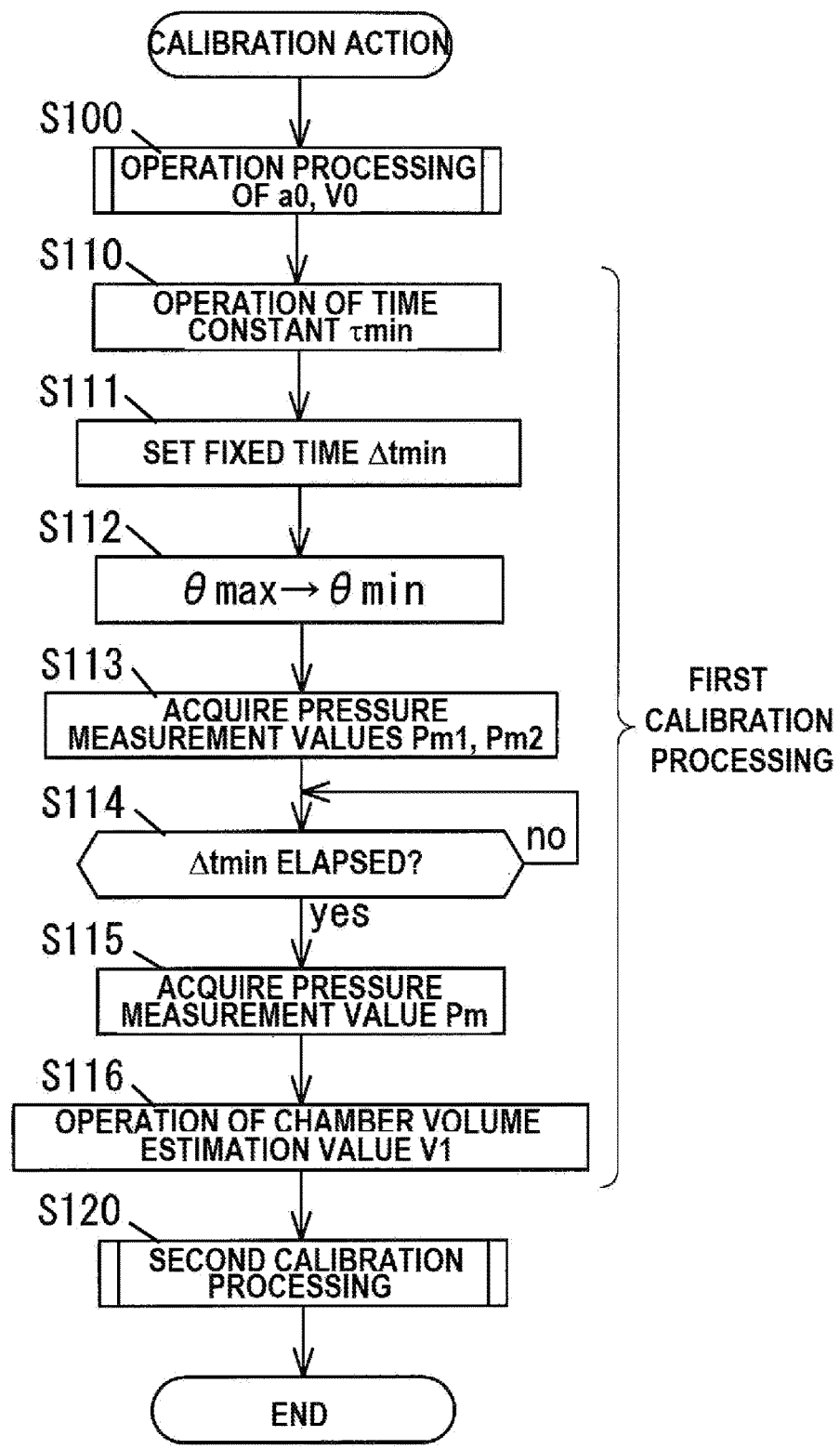
FIG. 10 is a flowchart showing a calibration processing procedure in a second embodiment.
Figure 11:
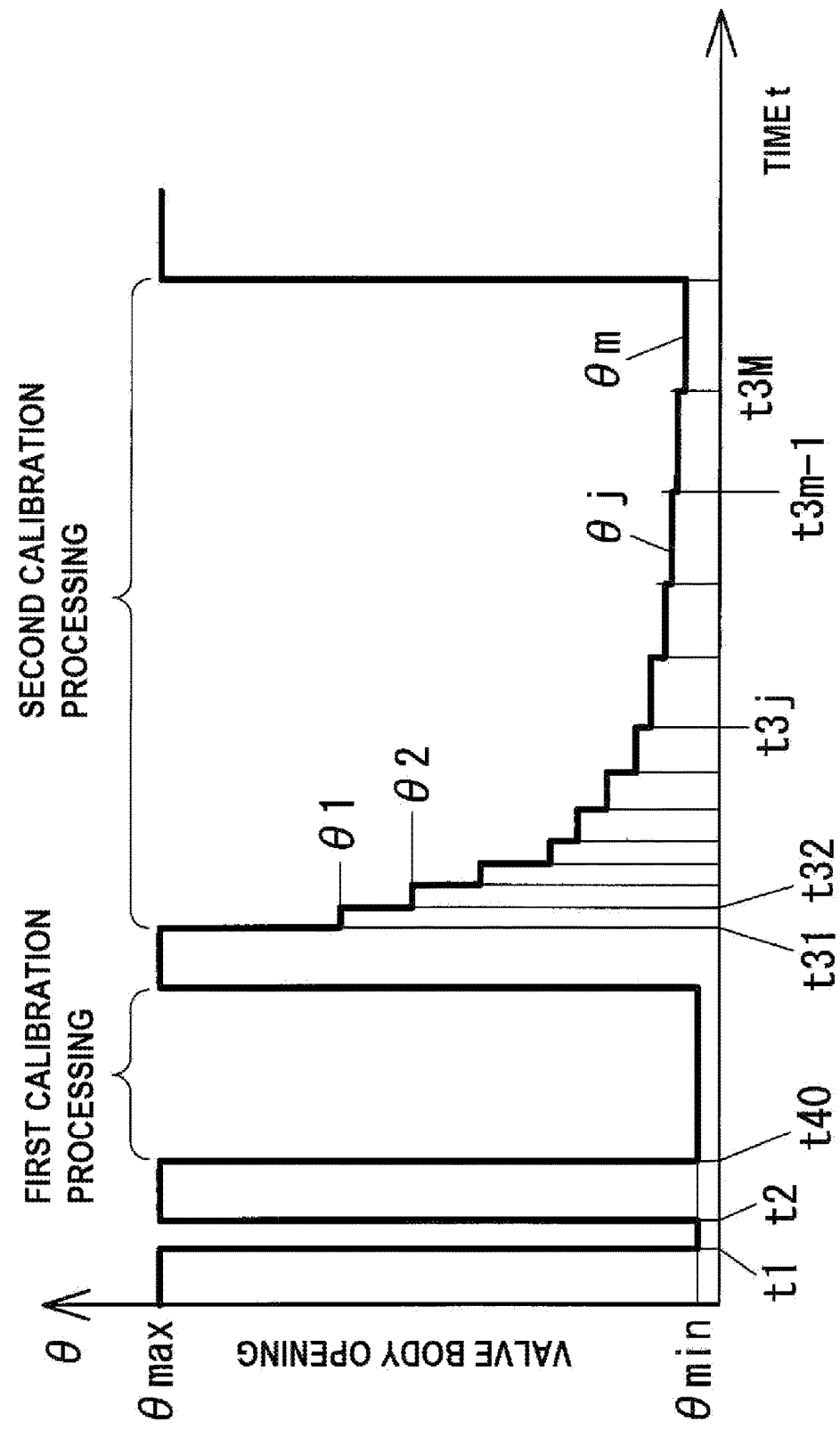
FIG. 11 is a view showing a transition of a valve body opening θ in a calibration action of a second embodiment.
Figure 12:
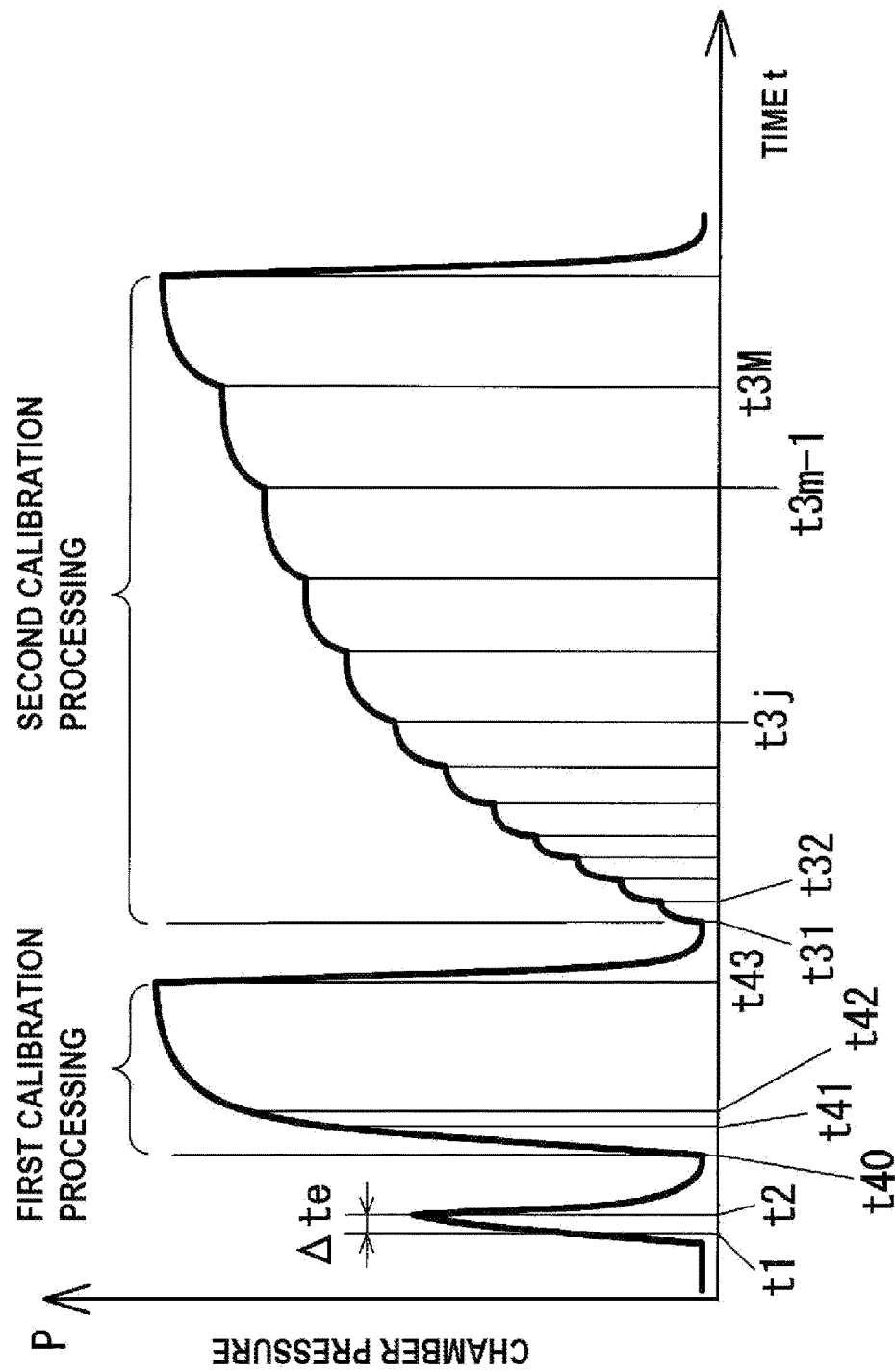
FIG. 12 is a view showing a transition of a pressure P of a chamber in a calibration action of a second embodiment.

FIG. 10 is a flowchart showing a calibration processing procedure in the second embodiment. FIGS. 11 and 12 are each a view for explaining the calibration action of the second embodiment, FIG. 11 is a view showing a transition of a valve body opening θ, and FIG. 12 is a view showing a transition of a chamber pressure P.

In an operation processing in Step S100 of FIG. 10, the same processing as the processing from Step S1 to Step S6 in FIG. 5 is performed. That is, the controller 32 changes a valve body opening θ from an opening position θmax to an opening position θmin in a stepwise manner, acquires a plurality of pressure measurement values Pmk during a pressure response, and outputs a plurality of data pairs (θmin, Pmk) to the estimator 1. Then, a gas species characteristic value a0 and a chamber volume estimation value V0 obtained through an estimation operation by the estimator 1 are input from the estimator 1 to the valve 3. That is, a gas species characteristic value a0 and a chamber volume estimation value V0 are calculated based on a plurality of pressure measurement values Pmk acquired during a pressure response from time t1 to time t2 in FIG. 12.

Next, according to the first calibration processing from Step S110 to Step S116, a chamber volume estimation value V1 is obtained. In Step S110, a time constant τmin when drive of a valve body opening θ is stopped at an opening position θmin is calculated based on the calculated gas species characteristic value a0 and chamber volume estimation value V0, according to Expression (7) below.

$$\tau\text{min}=V0/\{a0\times Se \text{ standard}(\theta\text{min})\} \quad (7)$$

In Step S111, a fixed time Δtmin during which a valve body is stopped in the first calibration processing is set based on the time constant τmin calculated in the Step S110. For example, a fixed time Δtmin is also set to 5 times the time constant, that is, Δtmin=5×τmin, in the same manner as above described. In Step S112, a valve body opening θ is driven from an opening position θmax to an opening position θmin (time t40). In Step S113, pressure measurement values Pm1 and Pm2 are obtained at times t41 and t42 during a pressure response.

In Step S114, it is decided if a time during which a valve body opening θ stops at an opening position θmin has exceeded the fixed time Δtmin set in Step S111. When it is judged in Step S111 that the stop time has exceeded the fixed time Δtmin, the processing proceeds to Step S115 to acquire a pressure measurement value Pm (time t43). In Step S116, a chamber volume estimation value V1 is operated based on the pressure measurement values Pm1 and Pm2 acquired at times t41 and t42, the pressure measurement value Pm acquired in Step S115, a flow rate Qin, and Expression (6). Specifically, times t41 and t42 are substituted for t1 and t2 of Expression (6) respectively, the pressure measurement value Pm acquired in Step S115 for Pend, and an effective exhaust rate Se(θmin) calculated according to Se(θmin)=Qin/Pm for Se(θ0).

In Step S120, the second calibration processing is performed according to the same processing as in the first embodiment. In this processing, a fixed time Δθj during which a valve body stops is set according to time constant τj=V1/{a0×Se standard(θj)} which is calculated using the gas species characteristic value a0 calculated in Step S100 and the chamber volume estimation value V1 operated in Step S116. It is noted that a time constant τj may be calculated using the chamber volume estimation value V0 calculated in Step S100, in place of the chamber volume estimation value V1 operated in Step S116.

In the second embodiment, an operation of a gas species characteristic value a0 and a chamber volume estimation value V0 by the estimator 1 is performed in a step previous to the first calibration processing and the second calibration processing, and a valve body stop time (fixed time Δtmin, Δtj) in the first calibration processing and the second calibration processing is most suitably set based on a time constant τ calculated using a gas species characteristic value a0 and a chamber volume estimation value V0. As a result, an appropriate equilibrium pressure can be obtained independently of a gas species used as a calibration gas, and a chamber volume and an effective exhaust rate can be accurately calculated. Also, when a gas species having a small molecular weight is used as a calibration gas, a time taken for the first calibration processing and the second calibration processing can be shortened.

Third Embodiment

In the third embodiment, an estimation operation by the estimator 1 is performed in an early stage of the first calibration processing period in which a chamber volume estimation value V1 is operated, and a fixed time Δt when performing an action of stopping drive of the valve body 31 in the first and second calibration processings is most suitably set based on a time constant τ calculated using an estimation value (a0, V0). That is, the operation processing of an estimation value (a0, V0) in Step S100 shown in FIG. 10 is performed in the first calibration processing period. The second calibration processing is the same as in the first and second embodiments.

Figure 13:
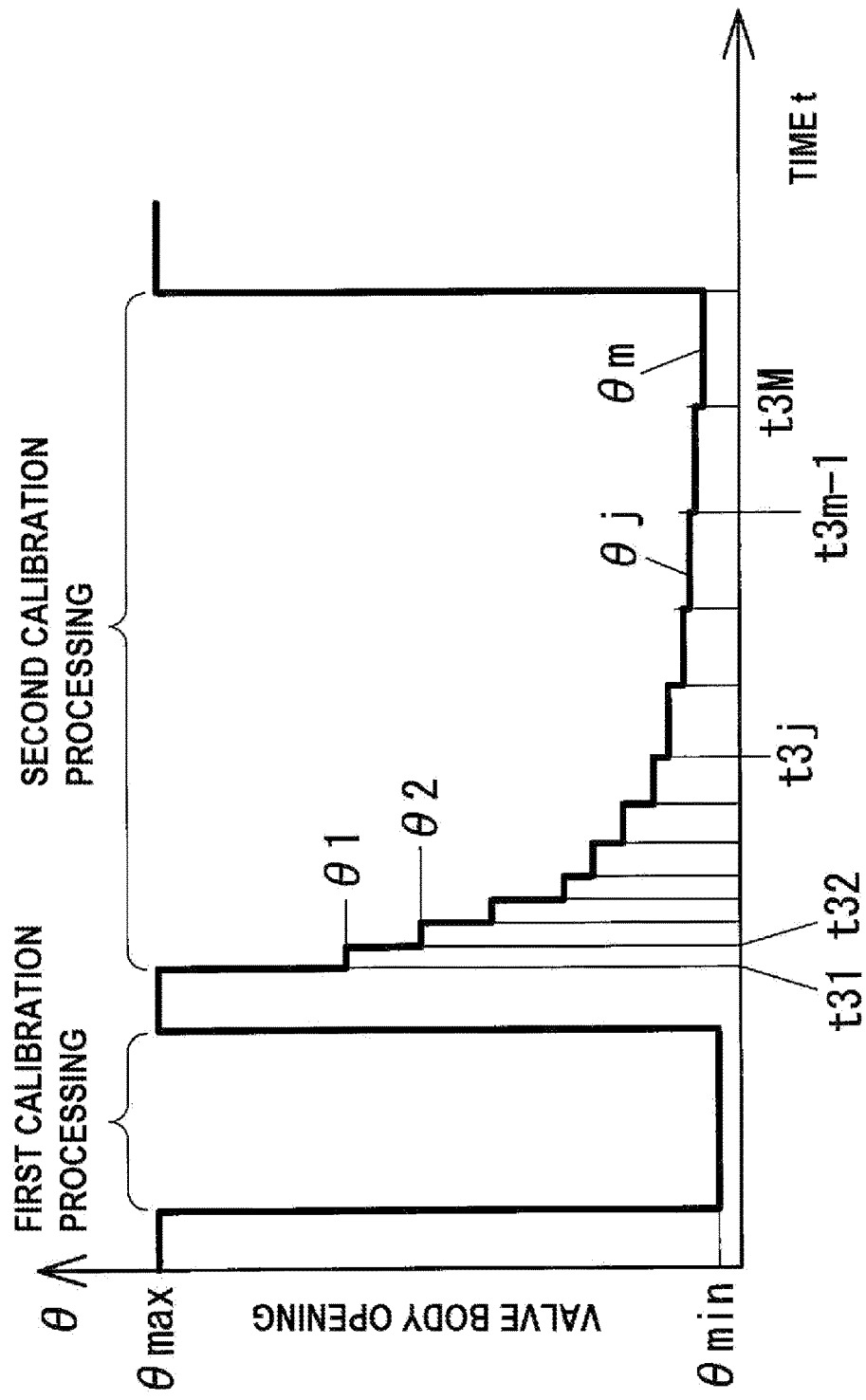
FIG. 13 is a view showing a transition of a valve body opening θ in a calibration action of a third embodiment.
Figure 14:
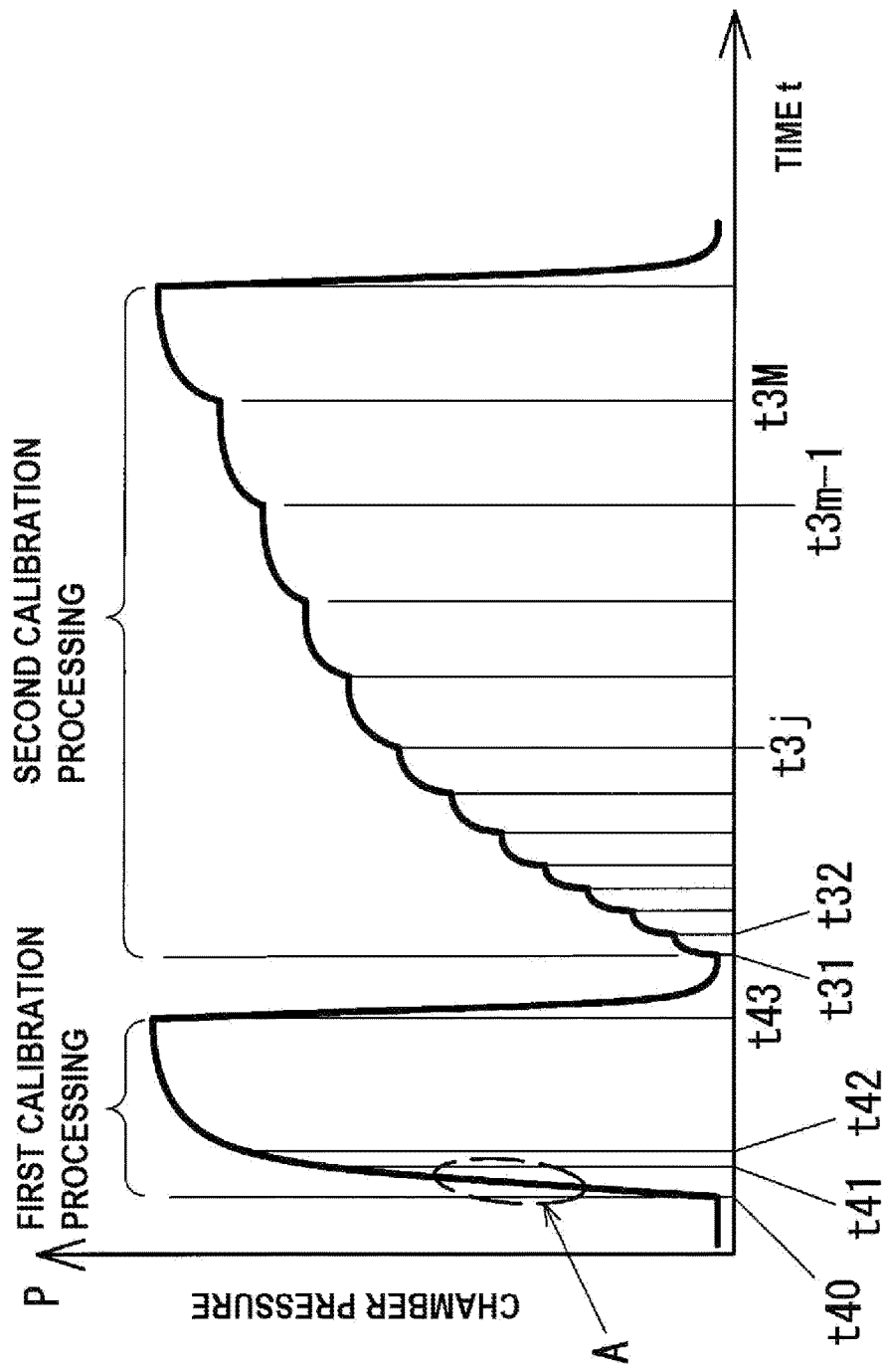
FIG. 14 is a view showing a transition of a pressure P of a chamber in a calibration action of a third embodiment.

FIGS. 13 and 14 are each a view for explaining a calibration action of the third embodiment, FIG. 13 is a view showing a transition of a valve body opening θ, and FIG. 14 is a view showing a transition of a chamber pressure P. In the third embodiment, a plurality of pressure measurement values Pmk is acquired in a period A of the first calibration processing starting from time t40 in which a valve body opening θ changes from an opening position θmax to an opening position θmin in a stepwise manner, and an estimation operation of a gas species characteristic value a0 and a chamber volume estimation value V0 based on the plurality of pressure measurement values Pmk is performed in the estimator 1. Then, a time constant τmin is calculated based on the calculated (a0, V0), a fixed time Δtmin is most suitably set based on the time constant τmin, and a calibration pressure measurement value Pm corresponding to an equilibrium pressure is acquired (time t43). Therefore, the period A is preferably set to an early period of the first calibration processing, for example, a period until an elapsed time after a valve body opening θ was fixed to an opening position θmin reaches a time corresponding to a time constant τmin. An operation of a chamber volume estimation value V1 in the first calibration processing is performed in the same manner as in the second embodiment.

In this manner, the measurement and operation processing of an estimation value (a0, V0) is performed in the period A of the first calibration processing period in the third embodiment. Therefore, it is unnecessary to provide an estimation processing period Δte for performing an estimation operation of an estimation value (a0, V0) as in FIG. 8, separately from the first and second calibration processings as in the second embodiment. As a result, a processing time of the entire calibration action can be shortened compared to the second embodiment. It is noted that although in the example shown in FIG. 14, times t41 and t42 at which pressure measurement values Pm1 and Pm2 for operating a chamber volume estimation value V1 are set after the period A, two of the plurality of pressure measurement values Pm acquired in the period A may be adopted to the above-described pressure measurement values Pm1 and Pm2.

It is noted that in the second and third embodiments, there has been described an example in which the second calibration processing starts after a valve body opening was temporarily switched from θmin to θmax. Thus, although a drive direction is set such that an opening position is decreased from a high opening (θmax) to a low opening (θmin) in a stepwise manner in the second calibration processing, the above-described direction is not limited. In brief, a drive direction in which an opening position is increased from a low opening (θmin) to a high opening (θmax) in a stepwise manner in the second calibration processing is also effective. In this case, a transition from the first calibration processing as a previous step to the second calibration processing as a subsequent step is enabled without switching a valve body opening, and furthermore, a calibration processing time can be shortened (not shown).

Persons skilled in the art understand that the above-described illustrative embodiments and variations are specific examples of the following aspects.

[1] An estimator according to an aspect is an estimator which estimates, for a vacuum pumping apparatus including a vacuum pump to vacuum pump a vacuum chamber and a vacuum valve disposed on a suction port side of the vacuum pump to adjust a chamber pressure of the vacuum chamber, a gas species characteristic value that is a ratio between a first effective exhaust rate of the vacuum pumping apparatus about an exhausted gas and a second effective exhaust rate of the vacuum pumping apparatus about a predetermined known gas, and a first chamber volume estimation value of the vacuum chamber. The estimator includes an acquisitor to acquire a plurality of data pairs each containing a valve body opening of the vacuum valve and the chamber pressure at the valve body opening, a storage to store correlation data between the valve body opening and the second effective exhaust rate about the predetermined known gas, and an operator to operate the gas species characteristic value and the first chamber volume estimation value based on an exhaust's expression representing a relationship among the second effective exhaust rate, a flow rate of a gas introduced into the vacuum chamber, a chamber volume, and a chamber pressure, the plurality of data pairs acquired in the acquisitor, and the correlation data.

The storage 12 of the estimator 1 stores the plurality of data pairs (θ, Pm) acquired and stored from the valve 3 and correlation data (Se standard (θj)) between a valve body opening θ and a second effective exhaust rate Se standard (θ). The operator 11 operates a gas species characteristic value a0 of an exhausted gas and a first chamber volume estimation value V0, based on the plurality of data pairs (θ, Pm), the correlation data (Se standard(θj)), and Exhaust's Expression (1A).

$$Qin = V \times (dP/dt) + a \times Se \text{ standard}(\theta) \times P \quad (1A)$$

Therefore, an estimation operation of a first chamber volume estimation value V0 can be performed, even when a gas species of a gas exhausted by the exhaust system 100 as a vacuum pumping apparatus is unknown.

[2] A vacuum valve according to an aspect is a vacuum valve disposed between a vacuum chamber and a vacuum pump to vacuum pump the vacuum chamber for adjusting a chamber pressure of the vacuum chamber, in which a chamber pressure of the vacuum chamber is adjusted based on the first chamber volume estimation value operated in the estimator according to the above-described [1]. As understood from Exhaust's Expression (1), a pressure change of the chamber 2 also depends on a volume of the chamber 2. Therefore, pressure adjustment by the valve 3 can be performed with high accuracy by using a first chamber volume estimation value V0 operated in the estimator 1.

[3] The vacuum valve according to the above-described [2] includes a first calibrator to fix an opening of a vacuum valve to a predetermined opening value and operate a second chamber volume estimation value of the vacuum chamber based on a chamber pressure of the vacuum chamber measured at the predetermined opening value, in which the first calibrator sets a time during which the valve body opening is fixed to the predetermined opening value, in accordance with pressure response characteristics of the vacuum chamber based on the gas species characteristic value and the first chamber volume estimation value operated in the estimator.

The controller 32 of the valve 3 to function as the first calibrator sets a time Δtmin during which a valve body opening θ is fixed to an opening position θmin of FIG. 11, based on a time constant τmin as pressure response characteristics calculated based on the operated gas species characteristic value a0 and first chamber volume estimation value V0. As a result, a calibration processing time by the first calibrator can be shortened while suppressing a reduction in operation accuracy of a second chamber volume value V1 operated in the first calibrator.

[4] A vacuum valve disposed between a vacuum chamber and a vacuum pump to vacuum pump the vacuum chamber for adjusting a chamber pressure of the vacuum chamber, wherein the vacuum valve comprises a first calibrator to fix an opening of a vacuum valve to a predetermined opening value and operate a second chamber volume estimation value of the vacuum chamber based on a chamber pressure of the vacuum chamber measured at the predetermined opening value, a chamber pressure of the vacuum chamber is adjusted based on the second chamber volume estimation value operated in the first calibrator, and the first calibrator sets a time during which the valve body opening is fixed to the predetermined opening value, in accordance with pressure response characteristics of the vacuum chamber based on the gas species characteristic value and the first chamber volume estimation value operated in the estimator according to the above-described [1].

The control unit 32 of the valve 3 functioning as the first calibrator sets the time Δtmin at which the valve body opening θ is fixed at the opening position θmin in FIG. 11 based on the gas type characteristic value a0 calculated by the estimator and the time constant τmin which is a pressure response characteristic calculated based on the first chamber volume V0. As a result, it is possible to shorten the calibration processing time by the first calibrator while suppressing a decrease in the calculation accuracy of the second chamber volume value V1 calculated by the first calibrator. Further, as can be seen from the exhaust equation (1), the pressure change in the chamber 2 also depends on the volume of the chamber 2. Therefore, by using the second chamber volume estimated value V1 calculated by the estimator 1, the pressure adjustment by the valve 3 can be performed with higher accuracy. Since the second chamber volume value V1 has a higher accuracy than the first chamber volume value V0, the pressure adjustment can be performed with higher accuracy by applying the second chamber volume value V1.

[5] In the vacuum valve according to the above-described [3] or [4], the plurality of data pairs used for an operation of the gas species characteristic value and the first chamber volume estimation value by the estimator is acquired in a period of the predetermined opening value. In a period of a predetermined opening value θmin in which a calibration processing of the first calibrator is performed, data pairs (θ, Pm) used for an operation of a gas species characteristic value a0 and a first chamber volume estimation value V0 are acquired. Therefore, it is not necessary to separately set a processing period for operating a gas species characteristic value a0 and a first chamber volume estimation value V0. As a result, a processing time of the entire calibration action can be shortened.

[6] The vacuum valve according to any of the above-described [2] to [5] includes a second calibrator to sequentially fix the valve body opening to a plurality of opening values and operate the first effective exhaust rate based on a chamber pressure of the vacuum chamber measured at each of the plurality of opening values, in which the second calibrator calculates pressure response characteristics of the vacuum chamber based on the gas species characteristic value and the first chamber volume estimation value operated in the estimator and sets a time during which the valve body opening is fixed to each of the plurality of opening values based on the calculated pressure response characteristics.

For example, when a first effective exhaust rate (Se(θ)) is operated based on a pressure measurement value (chamber pressure) Pmj measured by fixing a valve body opening θ to an opening value θj as in the second calibration processing shown in FIGS. 7 and 8, a fixed time Δtj during which a valve body opening θ is fixed to an opening value θj is set based on pressure response characteristics T calculated using a gas species characteristic value a0 and a first chamber volume estimation value V0. As a result, a processing period of the second calibration processing can be shortened while ensuring operation accuracy of a calculated first effective exhaust rate (Se(θ)).

Although various embodiments and variations have been described above, the present invention is not limited to these contents. Other aspects conceivable within the scope of the technical idea of the present invention also fall within the scope of the present invention. For example, although the estimator 1 and the valve 3 are separately disposed in the above-described embodiments, the configuration of the estimator 1 may be contained in the valve 3 to unify the estimator 1 and the valve 3 or may be contained in a higher-level controller which controls the entire vacuum pumping system.

What is claimed is:

1. An estimator which estimates, for a vacuum pumping apparatus including a vacuum pump to vacuum pump a vacuum chamber and a vacuum valve disposed on a suction port side of the vacuum pump to adjust a chamber pressure of the vacuum chamber, a gas species characteristic value that is a ratio between a first effective exhaust rate of the vacuum pumping apparatus about an exhausted gas and a second effective exhaust rate of the vacuum pumping apparatus about a predetermined known gas, and a first chamber volume estimation value of the vacuum chamber, the estimator comprising:
   an acquisitor to acquire a plurality of data pairs each containing a valve body opening of the vacuum valve and the chamber pressure at the valve body opening; and
   an operator to operate the gas species characteristic value and the first chamber volume estimation value, based on an exhaust's expression representing a relationship among the second effective exhaust rate, a flow rate of a gas introduced into the vacuum chamber, a chamber volume, and a chamber pressure, the plurality of data pairs acquired in the acquisitor, and correlation data between the valve body opening and the second effective exhaust rate about the predetermined known gas.

2. A vacuum valve disposed between a vacuum chamber and a vacuum pump to vacuum pump the vacuum chamber for adjusting a chamber pressure of the vacuum chamber, wherein
   a chamber pressure of the vacuum chamber is adjusted based on the first chamber volume estimation value operated in the estimator according to claim 1.

3. The vacuum valve according to claim 2, comprising a first calibrator to fix an opening of a vacuum valve to a predetermined opening value and operate a second chamber volume estimation value of the vacuum chamber based on a chamber pressure of the vacuum chamber measured at the predetermined opening value, wherein
   the first calibrator sets a time during which the valve body opening is fixed to the predetermined opening value, in accordance with pressure response characteristics of the vacuum chamber based on the gas species characteristic value and the first chamber volume estimation value operated in the estimator.

4. A vacuum valve disposed between a vacuum chamber and a vacuum pump to vacuum pump the vacuum chamber for adjusting a chamber pressure of the vacuum chamber, wherein
   the vacuum valve comprises a first calibrator to fix an opening of a vacuum valve to a predetermined opening value and operate a second chamber volume estimation value of the vacuum chamber based on a chamber pressure of the vacuum chamber measured at the predetermined opening value, a chamber pressure of the vacuum chamber is adjusted based on the second chamber volume estimation value operated in the first calibrator, and the first calibrator sets a time during which the valve body opening is fixed to the predetermined opening value, in accordance with pressure response characteristics of the vacuum chamber based on the gas species characteristic value and the first chamber volume estimation value operated in the estimator according to claim 1.

5. The vacuum valve according to claim 3, wherein the plurality of data pairs used for an operation of the gas species characteristic value and the first chamber volume estimation value by the estimator is acquired in a period of the predetermined opening value.

6. The vacuum valve according to claim 2, comprising a second calibrator to sequentially fix the valve body opening to a plurality of opening values and operate the first effective exhaust rate based on a chamber pressure of the vacuum chamber measured at each of the plurality of opening values, wherein the second calibrator calculates pressure response characteristics of the vacuum chamber based on the gas species characteristic value and the first chamber volume estimation value operated in the estimator and sets a time during which the valve body opening is fixed to each of the plurality of opening values based on the calculated pressure response characteristics.

7. The vacuum valve according to claim 4, wherein the plurality of data pairs used for an operation of the gas species characteristic value and the first chamber volume estimation value by the estimator is acquired in a period of the predetermined opening value.

8. The vacuum valve according to claim 4, comprising a second calibrator to sequentially fix the valve body opening to a plurality of opening values and operate the first effective exhaust rate based on a chamber pressure of the vacuum chamber measured at each of the plurality of opening values, wherein the second calibrator calculates pressure response characteristics of the vacuum chamber based on the gas species characteristic value and the first chamber volume estimation value operated in the estimator and sets a time during which the valve body opening is fixed to each of the plurality of opening values based on the calculated pressure response characteristics.

* * * * *